(12) United States Patent
Ulyate

(10) Patent No.: US 10,157,301 B2
(45) Date of Patent: Dec. 18, 2018

(54) ENCODED CELLS AND CELL ARRAYS

(71) Applicant: Gelliner Limited, Douglas (IM)

(72) Inventor: John Adam Ulyate, Kenridge (ZA)

(73) Assignee: Gelliner Limited, Douglas (IM)

( * ) Notice: Subject to any disclaimer, the term of this patent is extended or adjusted under 35 U.S.C. 154(b) by 10 days.

(21) Appl. No.: 15/304,112

(22) PCT Filed: Apr. 27, 2015

(86) PCT No.: PCT/GB2015/051217
§ 371 (c)(1),
(2) Date: Oct. 14, 2016

(87) PCT Pub. No.: WO2015/166221
PCT Pub. Date: Nov. 5, 2015

(65) Prior Publication Data
US 2017/0046549 A1 Feb. 16, 2017

(30) Foreign Application Priority Data
Apr. 28, 2014 (GB) .................................. 1407432.2

(51) Int. Cl.
G06K 7/10 (2006.01)
G06K 7/14 (2006.01)
G06K 19/06 (2006.01)

(52) U.S. Cl.
CPC ......... G06K 7/1417 (2013.01); G06K 7/1413 (2013.01); G06K 19/06018 (2013.01); G06K 19/06037 (2013.01); G06K 19/06056 (2013.01)

(58) Field of Classification Search
CPC ....... G06K 7/14; G06K 7/1404; G06K 7/1417
(Continued)

(56) References Cited

U.S. PATENT DOCUMENTS 1,021,189 A 3/1912 Hill
4,874,936 A 10/1989 Chandler et al.
(Continued)

FOREIGN PATENT DOCUMENTS

CN 103383738 A 11/2013
EP 0665510 A1 8/1995
(Continued)

OTHER PUBLICATIONS

Combined Search and Examination Report, UK Application No. GB1407432.2, dated Sep. 21, 2015, 5 pages.
(Continued)

*Primary Examiner* — Daniel St Cyr
(74) *Attorney, Agent, or Firm* — McDonnell Boehnen Hulbert & Berghoff LLP

(57) ABSTRACT

Methods pertaining to encoding and decoding binary identifiers within a cell array are described. A binary identifier received by computing device can be encoded according to an encoding scheme. The cell array can include multiple encoded cells, each of which indicates a predetermined sequence of two or more bits, and which includes a perimeter, and both an alignment mark and a line pattern within the perimeter. The line pattern can be one of an empty-cell line pattern, a pattern including one or more asymmetrical radial vectors, one or more diametrical vectors, a symmetric cross, or a symmetrical star, or some other line pattern. The encoding scheme can define a plurality of cell colors that correspond to a predetermined sequence of two or more bits. The bits corresponding to a cell color can be redundant to bits corresponding to a line pattern for confirming accuracy of decoding a cell.

20 Claims, 11 Drawing Sheets

(58) Field of Classification Search
USPC .............. 235/462.1, 462.11, 462.41, 462.49
See application file for complete search history.

(56) References Cited

U.S. PATENT DOCUMENTS

| | | | |
|---|---|---|---|
| 5,288,986 | A | 2/1994 | Pine et al. |
| 5,507,527 | A | 4/1996 | Tomioka et al. |
| 5,971,283 | A | 10/1999 | Sawaguchi |
| 6,070,805 | A | 6/2000 | Kaufman et al. |
| 7,074,478 | B2 | 7/2006 | Abraham |
| 7,490,776 | B2 | 2/2009 | Thuries |
| 7,990,599 | B2 | 8/2011 | Kakino et al. |
| 8,505,823 | B2 | 8/2013 | Bhagwan et al. |
| 8,640,960 | B2 | 2/2014 | Wang et al. |
| 9,773,138 | B1* | 9/2017 | Amy .................. G06K 7/10544 |
| 2002/0028015 | A1 | 3/2002 | Tack-don et al. |
| 2004/0028258 | A1 | 2/2004 | Naimark et al. |
| 2004/0061725 | A1 | 4/2004 | Usuda et al. |
| 2005/0199721 | A1 | 9/2005 | Chang et al. |
| 2006/0155882 | A1* | 7/2006 | Jochemsen ......... G06F 11/1068 710/3 |
| 2006/0259744 | A1* | 11/2006 | Matthes .............. G06F 15/7867 712/220 |
| 2011/0110586 | A1 | 5/2011 | Takura et al. |
| 2011/0180615 | A1 | 7/2011 | Lapstun et al. |
| 2013/0301870 | A1 | 11/2013 | Mow et al. |

FOREIGN PATENT DOCUMENTS

| | | |
|---|---|---|
| EP | 1 500 066 | 1/2005 |
| JP | H05-225408 A | 9/1993 |
| JP | 2001319200 | 11/2001 |
| JP | 2009295108 | 12/2009 |
| KR | 1020010087787 | 9/2001 |
| NZ | 260173 A | 11/1996 |
| WO | 2003/007137 | 1/2003 |
| WO | 03090182 A1 | 10/2003 |

OTHER PUBLICATIONS

Written Opinion of the International Searching Authority, International Application No. PCT/GB2015/051217, dated Jul. 1, 2015, 17 pages.
International Search Report, International Application No. PCT/GB2015/051217, dated Jul. 1, 2015, 4 pages.
New Zealand Intellectual Property Office, First Examination Report, dated Aug. 11, 2017, New Zealand Patent Application No. 724612 (6 pages).
Office Action, Japanese Patent Application No. 2016-561617, dated Dec. 11, 2017.
Examiner's Report, Canadian Application No. 2,946,244, dated Oct. 6, 2017.
European Patent Office Examination Report, European Application No. 15720763.0-1879, dated Nov. 15, 2017.
Examination Report, New Zealand Application No. 724612, dated Feb. 15, 2018.
Australia Patent Office, IP Australia, Examination Report No. 1 for Standard Patent Application, dated Apr. 11, 2017, Australia Patent Application No. 2015255047 (3 pages).
Australia Patent Office, IP Australia, Notice of Acceptance for Patent Application, dated Jun. 7, 2017, Australia Patent Application No. 2015255047 (3 pages).
UK Intellectual Property Office, Patents Directorate, Intention to Grant under Section 18(4), dated May 19, 2017, Application No. GB1407432.2 (2 pages).
Office Action, Japanese Patent Application No. 2016-561617, dated May 9, 2018.
Intellectual Property Corporation of Malaysia; Preliminary Examination—Clear Formalities Report for Malaysian Patent Application No. PI 2016001834; dated Jan. 16, 2017.
Intellectual Property Office of Singapore; Notice of Eligibility for Grant for Singapore Patent Application No. 11201608971V; dated May 3, 2018.
Intellectual Property Office of Singapore; Notification of Grant for Singapore Patent Application No. 11201608971V; dated Jun. 28, 2018.
Intellectual Property Office of Singapore; Examination Report for Singapore Patent Application No. 11201608971V; dated May 2, 2018.
Intellectual Property Office of the Philippines, Bureau of Patents; Substantive Examination Report for Philippines Patent Application No. 1/2016/502106; dated Oct. 20, 2016.
New Zealand Intellectual Property Office; Further Examination Report for New Zealand Patent Application No. 724612; dated Jul. 6, 2018.
European Patent Office; Communication pursuant to Article 94(3) EPC for European Patent Application No. 15 720 763.0-1221; dated Oct. 8, 2018.
Korean Intellectual Property Office; Notice of Preliminary Rejection for Korean Patent Application No. 10-2016-7033151; dated Apr. 9, 2018; with English translation.
Australian Government—IP Australia; Examination Report No. 1 for standard patent application for Australian patent application No. 2017225025; dated Aug. 10, 2018.
Korean Intellectual Property Office; Notice of Final Rejection for Korean Patent Application No. 10-2016-7033151; dated Sep. 18, 2018; with English translation.
Intellectual Property Office of Singapore; Written Opinion for Singapore Patent Application No. 11201608971V; dated Sep. 19, 2017.
State Intellectual Property Office (SIPO) of the Peoples Republic of China; Notification of the First Office Action for Chinese Patent Application No. 201580023602.1; dated Aug. 28, 2018; with English translation.

* cited by examiner

```
┌─────────────────────────────────────────────────┐
│  RECEIVING, BY A COMPUTING DEVICE, DATA SPECIFYING A │
│  CELL ARRAY, WHEREIN THE CELL ARRAY INCLUDES ONE OR │
│  MORE ENCODED CELLS THAT ENCODE A BINARY IDENTIFIER │
│   IN ACCORDANCE WITH AN ENCODING SCHEME, WHEREIN  │
│      EACH ENCODED CELL INDICATES A PREDETERMINED   │
│      SEQUENCE OF TWO OR MORE BITS, AND WHEREIN EACH │
│       ENCODED CELL INCLUDES A PERIMETER, AN ALIGNMENT │
│         MARK WITHIN THE PERIMETER, AND A LINE PATTERN │
│                    WITHIN THE PERIMETER            │
└─────────────────────────────────────────────────┘
                         │         ~172
                         ▼
┌─────────────────────────────────────────────────┐
│       DISPLAYING, BY A DISPLAY CONNECTED TO THE   │
│    COMPUTING DEVICE, A GRAPHICAL REPRESENTATION OF │
│     THE CELL ARRAY, WHEREIN THE DISPLAYED CELL ARRAY │
│       INCLUDES THE ONE OR MORE ENCODED CELLS THAT  │
│     ENCODE THE BINARY IDENTIFIER IN ACCORDANCE WITH │
│        THE ENCODING SCHEME, WHEREIN EACH DISPLAYED │
│   ENCODED CELL INDICATES A PREDETERMINED SEQUENCE  │
│     OF TWO OR MORE BITS, AND WHEREIN EACH ENCODED  │
│  CELL INCLUDES A PERIMETER, AN ALIGNMENT MARK WITHIN │
│        THE PERIMETER, AND A LINE PATTERN WITHIN THE │
│                         PERIMETER                  │
└─────────────────────────────────────────────────┘
                                    ~174

↗
                  /       FIG. 17
                170
```

ENCODED CELLS AND CELL ARRAYS

BACKGROUND

Barcodes are, in general, optical representations of binary data encoded by means of positional or dimensional attributes. Such barcodes can be scanned by optical scanners that, together with interpretive software, allow the encoded binary data to be recovered.

A one-dimensional ("1-D") or linear barcode consists of bars (i.e., black lines) and spaces (i.e., white spaces) of various widths and employs width encoding only. Such 1-D barcodes are scanned from side-to-side and information is relevant in one dimension only. A single-wide bar represents a binary one. A single-wide space represents a zero.

A two-dimensional ("2-D") or matrix barcode consists of an arrangement of dark and light squares and uses both width and height encoding. In a 2-D matrix code, the matrix code consists of modules. A dark module is a binary one and a light module is a binary zero. 2-D barcodes are scanned both from side-to-side and top-to-bottom and information is relevant in two dimensions. An example of such a 2-D barcode is the well-known and widely-used QR code.

The applicant has appreciated that it is possible to provide an encoded cell that represents more than a single bit of information, thereby enabling the provision of encoded cells (e.g., a cell array) that represent greater quantities of information than prior art barcodes. Furthermore, the applicant has appreciated that it is possible to include, within a cell array, cells that identify an encoding scheme used to encode other cells in the cell array. Such identity can reduce an amount of time needed to decode a cell array. Furthermore still, the applicant has appreciated that a cell within a cell array can include redundant aspects for confirming accuracy of decoding the cell array. Furthermore still, the applicant has appreciated that encoded cells with different noise level tolerances can be defined to accommodate different means for outputting a cell or cell array and to accommodate different means of capturing a cell or cell array.

SUMMARY

Example embodiments are described herein. In one respect, an example embodiment takes the form of a method comprising: receiving, by a computing device, a binary identifier comprising a plurality of bits, determining, by the computing device, one or more encoded cells that encode the binary identifier in accordance with an encoding scheme, wherein each encoded cell indicates a predetermined sequence of two or more bits, and wherein each encoded cell includes a perimeter, an alignment mark within the perimeter, and a line pattern within the perimeter, generating, by the computing device, a cell array that includes the one or more encoded cells, and outputting, by the computing device, data for producing a graphical representation of the cell array In another respect, an example embodiment takes the form of a machine comprising: a computing device, and a computer-readable medium storing program instructions, that when executed by the computing device, cause a set of functions to be performed, the set of functions comprising: receiving, by the computing device, a binary identifier comprising a plurality of bits, determining, by the computing device, one or more encoded cells that encode the binary identifier in accordance with an encoding scheme, wherein each encoded cell indicates a predetermined sequence of two or more bits, and wherein each encoded cell includes a perimeter, an alignment mark within the perimeter, and a line pattern within the perimeter, generating, by the computing device, a cell array that includes the one or more encoded cells, and outputting, by the computing device, data for producing a graphical representation of the cell array.

In another respect, an example embodiment takes the form of a non-transitory computer-readable medium storing program instructions, that when executed by a computing device, cause a set of functions to be performed, the set of functions comprising: receiving, by the computing device, a binary identifier comprising a plurality of bits, determining, by the computing device, one or more encoded cells that encode the binary identifier in accordance with an encoding scheme, wherein each encoded cell indicates a predetermined sequence of two or more bits, and wherein each encoded cell includes a perimeter, an alignment mark within the perimeter, and a line pattern within the perimeter, generating, by the computing device, a cell array that includes the one or more encoded cells, and outputting, by the computing device, data for producing a graphical representation of the cell array.

In another respect, an example embodiment takes the form of a method comprising: receiving, by a computing device, a captured cell array including one or more encoded cells that encode a binary identifier in accordance with an encoding scheme, wherein each encoded cell indicates a predetermined sequence of two or more bits, and wherein each encoded cell includes a perimeter, an alignment mark within the perimeter, and a line pattern within the perimeter, decoding, by the computing device, each encoded cell in the captured cell array in accordance with a decoding scheme corresponding to the encoding scheme to recover the bits indicated by the encoded cell, recovering, by the computing device, the binary identifier by combining the recovered bits, and outputting, by the computing device, the recovered binary identifier.

In another respect, an example embodiment, takes the form of a machine comprising: a computing device, and a computer-readable medium storing program instructions, that when executed by the computing device, cause a set of functions to be performed, the set of functions comprising: receiving, by the computing device, a captured cell array including one or more encoded cells that encode a binary identifier in accordance with an encoding scheme, wherein each encoded cell indicates a predetermined sequence of two or more bits, and wherein each encoded cell includes a perimeter, an alignment mark within the perimeter, and a line pattern within the perimeter, decoding, by the computing device, each encoded cell in the captured cell array in accordance with a decoding scheme corresponding to the encoding scheme to recover the bits indicated by the encoded cell, recovering, by the computing device, the binary identifier by combining the recovered bits, and outputting, by the computing device, the recovered binary identifier.

In another respect, an example embodiment takes the form of a non-transitory computer-readable medium storing program instructions, that when executed by a computing device, cause a set of functions to be performed, the set of functions comprising: receiving, by the computing device, a captured cell array including one or more encoded cells that encode a binary identifier in accordance with an encoding scheme, wherein each encoded cell indicates a predetermined sequence of two or more bits, and wherein each encoded cell includes a perimeter, an alignment mark within the perimeter, and a line pattern within the perimeter, decoding, by the computing device, each encoded cell in the captured cell array in accordance with a decoding scheme corresponding to the encoding scheme to recover the bits indicated by the encoded cell, recovering, by the computing device, the binary identifier by combining the recovered bits, and outputting, by the computing device, the recovered binary identifier.

In another respect, an example embodiment takes the form of a method comprising: receiving, by a computing device, data specifying a cell array, wherein the cell array includes one or more encoded cells that encode a binary identifier in accordance with an encoding scheme, wherein each encoded cell indicates a predetermined sequence of two or more bits, and wherein each encoded cell includes a perimeter, an alignment mark within the perimeter, and a line pattern within the perimeter, and displaying, by a display connected to the computing device, a graphical representation of the cell array, wherein the displayed cell array includes the one or more encoded cells that encode the binary identifier in accordance with the encoding scheme, wherein each displayed encoded cell indicates a predetermined sequence of two or more bits, and wherein each encoded cell includes a perimeter, an alignment mark within the perimeter, and a line pattern within the perimeter.

In another respect, an example embodiment takes the form of a machine comprising: a display, a computing device, and a computer-readable medium storing program instructions, that when executed by the computing device, cause a set of functions to be performed, the set of functions comprising: receiving, by the computing device, data specifying a cell array, wherein the cell array includes one or more encoded cells that encode a binary identifier in accordance with an encoding scheme, wherein each encoded cell indicates a predetermined sequence of two or more bits, and wherein each encoded cell includes a perimeter, an alignment mark within the perimeter, and a line pattern within the perimeter, and displaying, by the display connected to the computing device, a graphical representation of the cell array, wherein the displayed cell array includes the one or more encoded cells that encode the binary identifier in accordance with the encoding scheme, wherein each displayed encoded cell indicates a predetermined sequence of two or more bits, and wherein each encoded cell includes a perimeter, an alignment mark within the perimeter, and a line pattern within the perimeter.

In another respect, an example embodiment takes the form of a computer-readable medium storing program instructions, that when executed by a computing device, cause a set of functions to be performed, the set of functions comprising: receiving, by the computing device, data specifying a cell array, wherein the cell array includes one or more encoded cells that encode a binary identifier in accordance with an encoding scheme, wherein each encoded cell indicates a predetermined sequence of two or more bits, and wherein each encoded cell includes a perimeter, an alignment mark within the perimeter, and a line pattern within the perimeter, and displaying, by a display connected to the computing device, a graphical representation of the cell array, wherein the displayed cell array includes the one or more encoded cells that encode the binary identifier in accordance with the encoding scheme, wherein each displayed encoded cell indicates a predetermined sequence of two or more bits, and wherein each encoded cell includes a perimeter, an alignment mark within the perimeter, and a line pattern within the perimeter.

In another respect, an example embodiment takes the form of an article of manufacture comprising: a surface, and a cell array, readable by a computing device, on the surface, wherein the cell array includes one or more encoded cells that encode, in accordance with an encoding scheme, a binary identifier that represents information pertaining to the article of manufacture, wherein the binary identifier comprises a plurality of bits, wherein each encoded cell indicates a predetermined sequence of two or more bits, and wherein each encoded cell includes a perimeter, an alignment mark within the perimeter, and a line pattern within the perimeter.

In embodiments of the disclosure comprising a non-transitory computer-readable medium or a program executable on a computer-readable medium, the computer-readable medium may store instructions on physical media such as a DVD, or a solid state drive, or a hard drive. Alternatively, in any of these embodiments, a transitory computer-readable medium may be used instead of the non-transitory computer-readable medium. For example, a program may be provided in the form of instructions provided over a connection such as a network connection which is linked to a network such as the Internet.

These as well as other aspects and advantages will become apparent to those of ordinary skill in the art by reading the following detailed description, with reference where appropriate to the accompanying drawings. The embodiments described herein are intended to be examples only and do not necessarily limit the scope of the invention as recited in the claims.

DESCRIPTION OF THE FIGURES

Example embodiments are described herein with reference to the drawings.

FIG. 17 is a flowchart depicting another set of functions that can be carried out in accordance with one or more example embodiments.

DETAILED DESCRIPTION

I. Introduction

This description describes example embodiments, at least some of which pertain to encoded cells and cell arrays. In general, an encoded cell can include a perimeter, an alignment mark within the perimeter, and a line pattern within the perimeter. A cell array can include two or more cells. A cell array can be referred to as an "encoded cell array." A cell array can include cells that encode bits of a binary identifier and other cells.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements unless the context clearly dictates otherwise. Throughout this description, the terms "multiple" and a "plurality of" refer to "two or more" or "more than one."

The diagrams, depictions, and flow charts shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (e.g., machines, interfaces, functions, orders, or groupings of functions or operations) can be used instead. Each element, or components of an element, shown in the figures or described in this description, alone or in combination with one or more other elements or components thereof, can be referred to as a system or a machine. Furthermore, various functions or operations described as being performed by one or more elements can be carried out by a processor executing computer-readable program instructions or by any combination of hardware, firmware, or software.

II. Encoded Cell

Figure 1:
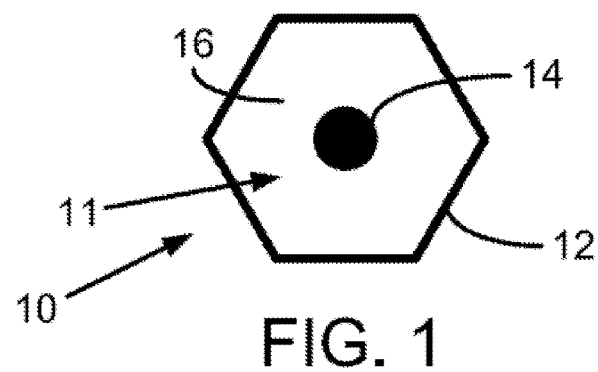
FIG. 1 is a schematic representation of an encoded cell in accordance with one or more example embodiments.

FIG. 1 illustrates an example cell 10. Cell 10 includes a perimeter 12, an alignment mark 14 within perimeter 12, and a line pattern 16 within perimeter 12. Aspects of cell 10, such as line pattern 16, can represent data, such as a single predetermined bit of binary data (or more simply, a bit), a predetermined sequence of two or more bits of binary data (or more simply, bits), or other data as described herein. In such cases, cell 10 can be referred to as encoded cell 10. "Within the perimeter" refers to inside the perimeter (e.g., inside an area defined by perimeter 12). The area defined by perimeter 12 can be referred to as a cell body 11. As shown in FIG. 1, perimeter 12 and cell body 11 are hexagonal-shaped, but are not so limited. Geometrically speaking, cell 10 can have one or more lines of symmetry. A cell 10 can include a centre, such as a location within the perimeter at which two or more of the cell's lines of symmetry intersect.

Line pattern 16 can be referred to as an empty-cell line pattern, which is a cell line pattern that lacks any lines within perimeter 12. Examples of line patterns with at least one line within perimeter 12 are shown in FIG. 2 to FIG. 5, FIG. 12, FIG. 13, and FIG. 18. Each line pattern of an encoded cell can correspond to distinct cell state. For example, an empty-cell line pattern, such as line pattern 16, can correspond to a first state (e.g., state #1) of encoded cell 10.

Perimeter 12 defines a continuous border of cell 10. Perimeter 12 can be black or another colour, such as a colour identified in Table 6 below. Perimeter 12 can be a polygon such as, but not limited to, a triangle, a quadrilateral, a pentagon, a hexagon, or a dodecagon. A perimeter of a cell is not so limited, however, as at least a portion of a perimeter can be curved. As an example, a perimeter can comprise a circular perimeter, an oval perimeter or an elliptical perimeter.

Alignment mark 14 can include or be represented as a circle (e.g., a dot), but is not so limited. Perimeter 12 and alignment mark 14 can each include a respective centre. Alignment mark 14 can be centrally located (i.e., a centre of alignment mark 14 can be located at a centre of cell 10). Alternatively, a centre of alignment mark 14 can be offset from a centre of cell 10.

A cell array can include multiple encoded cells. A cell array can encode a binary identifier. A line pattern in each encoded cell can correspond to one of a plurality of predefined line patterns. Each predefined line pattern and each cell including that line pattern within its perimeter 12 can correspond to a cell state. A line pattern or cell state can correspond to a predetermined sequence of two or more bits. Other line patterns or cell state can correspond to other data, such as a decoding instruction. A cell with such line pattern can be referred to as a "decoding cell."

Figure 18:
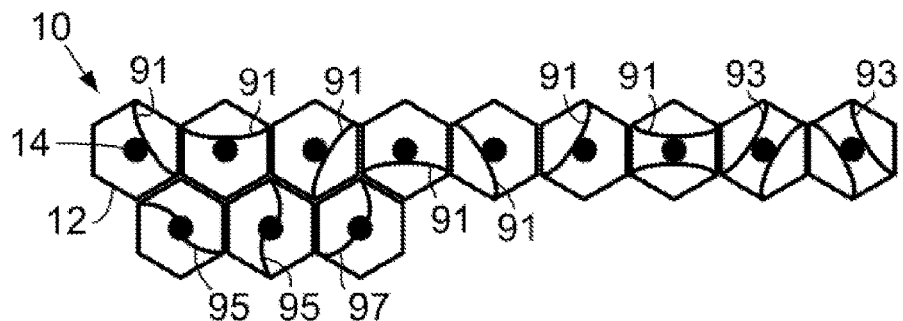
FIG. 18 illustrates additional states or line patterns of the encoded cell of FIG. 1 in accordance with one or more example embodiments.

A plurality of predefined line patterns can include the empty-cell line pattern 16. Each of one or more of the predefined line patterns can include one or more asymmetrical radial vectors, such as an asymmetrical radial vector line pattern shown in FIG. 2. Each of the one or more plurality of predefined line patterns can include one or more diametric vectors, such as a diametric vector line pattern shown in FIG. 3. Each of the one or more of the plurality of predefined line patterns can include a symmetrical cross, such as a symmetrical cross line pattern shown in FIG. 4. Each of the one or more of the plurality of predefined line patterns can include a symmetric star, such as the symmetric star line pattern shown in FIG. 5. Each of the one or more of the plurality of predefined line patterns can include a curved line pattern as shown in FIG. 18.

A decoding cell can indicate an encoding scheme used to encode a binary identifier. For example, a decoding cell can indicate an encoding scheme that uses eight cell states to represent a predetermined sequence of three bits. As another example, a decoding cell can indicate an encoding scheme that uses coloured cells to represent a predetermined sequence of two or more bits.

A decoding cell can indicate a variety of decoding instructions. As an example, a decoding instruction can include a start-of-row instruction that indicates a cell is the first cell in a cell array row (i.e., a row of the cell array). A computing device can determine that an encoded cell adjacent to the decoding cell in that row is the first cell of the cell array that can be decoded in order to recover a binary identifier. As another example, a decoding instruction can include an end-of-row instruction that indicates a cell is the last cell in a cell array row. A computing device can determine that an encoded cell adjacent to the decoding cell including the end-of-row instruction is the last cell in that row to decode in order to recover the binary identifier. As another example, a decoding instruction can include an end-of-array instruction that a computing device can use to determine there are no additional cells in the cell array to scan or decode.

Figure 2:
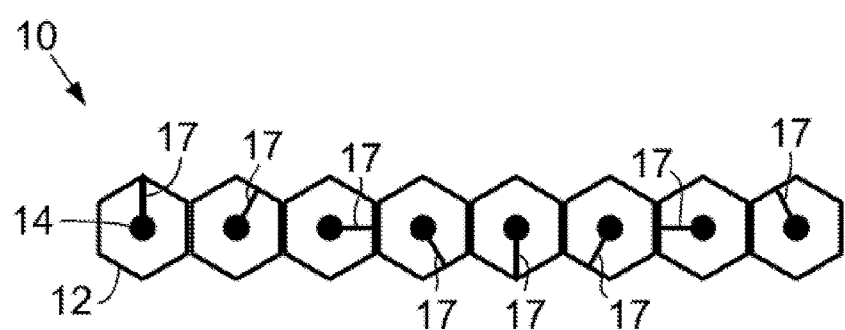
FIG. 2 illustrates a plurality of states or line patterns of the encoded cell of FIG. 1 in accordance with one or more example embodiments.

Next, FIG. 2 shows eight instances of encoded cell 10 including a perimeter 12, an alignment mark 14 within perimeter 12, and a line pattern 17 within perimeter 12. The perimeters and alignment marks in these encoded cells can be identical. Each line pattern 17 shown in FIG. 2 is located at a different number of degrees from a given reference angle.

Each encoded cell 10 shown in FIG. 2 includes a distinct line pattern 17 extending from an alignment mark to perimeter. The line patterns 17 are examples of asymmetrical radial lines, which can be referred to as "asymmetrical radial vectors" or "asymmetrical line patterns." Additionally, an asymmetrical radial line within a cell can be configured within one of the following example arrangements: (i) the asymmetrical radial line extends away from an alignment mark to a point short of perimeter, (ii) the asymmetrical radial line extends away from a perimeter to a point short of an alignment mark, and (iii) the asymmetrical radial line extends between a perimeter and an alignment mark without contacting either of the perimeter and the alignment mark.

In accordance with an example embodiment, an asymmetrical line pattern (e.g., an asymmetrical radial line) of a cell can be aligned in any one of eight possible directions in angular increments of 45° from a given reference direction, namely at angular positions of 0°, 45°, 90°, 135°, 180°, 225°, 270° and 315° from the reference direction, as shown in FIG. 2. The asymmetrical line patterns 17, as an attribute of cell 10, define an additional eight states (e.g., states #2 to #9) of cell 10. On their own, these additional eight states can represent three bits of embedded binary data, as illustrated in Table 1.

TABLE 1

| State | Angular Position | Binary Data |
|-------|------------------|-------------|
| #2 | 0° | 000 |
| #3 | 45° | 001 |
| #4 | 90° | 010 |
| #5 | 135° | 011 |
| #6 | 180° | 100 |
| #7 | 225° | 101 |
| #8 | 270° | 110 |
| #9 | 315° | 111 |

Figure 3:
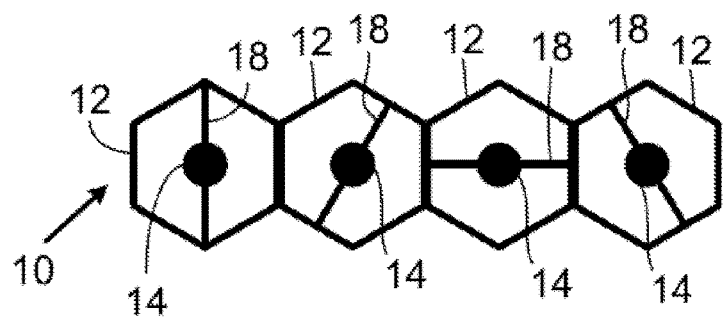
FIG. 3 illustrates additional states or line patterns of the encoded cell of FIG. 1 in accordance with one or more example embodiments.

Cell 10 can include another type of line pattern in the form of a diametrical (i.e. symmetrically opposing) vector 18 passing through alignment mark 14, as illustrated in FIG. 3. A diametrical vector can be referred to as a "diametrical line pattern." In accordance with one or more example embodiments, diametrical vectors 18 may be aligned in any one of four possible directions in angular increments of 45° from a given reference direction, namely at angular positions of 0°, 45°, 90°, and 135° from the reference direction, as shown in FIG. 3. The addition of the diametrical vectors 18 as a further attribute of cell 10 defines an additional four states (e.g., states #10 to #13) of cell 10, which, on their own, can represent two bits of embedded information, as illustrated in Table 2.

TABLE 2

| State | Angular Position | Binary Data |
|-------|------------------|-------------|
| #10 | 0° | 00 |
| #11 | 45° | 01 |
| #12 | 90° | 10 |
| #13 | 135° | 11 |

Figure 11:
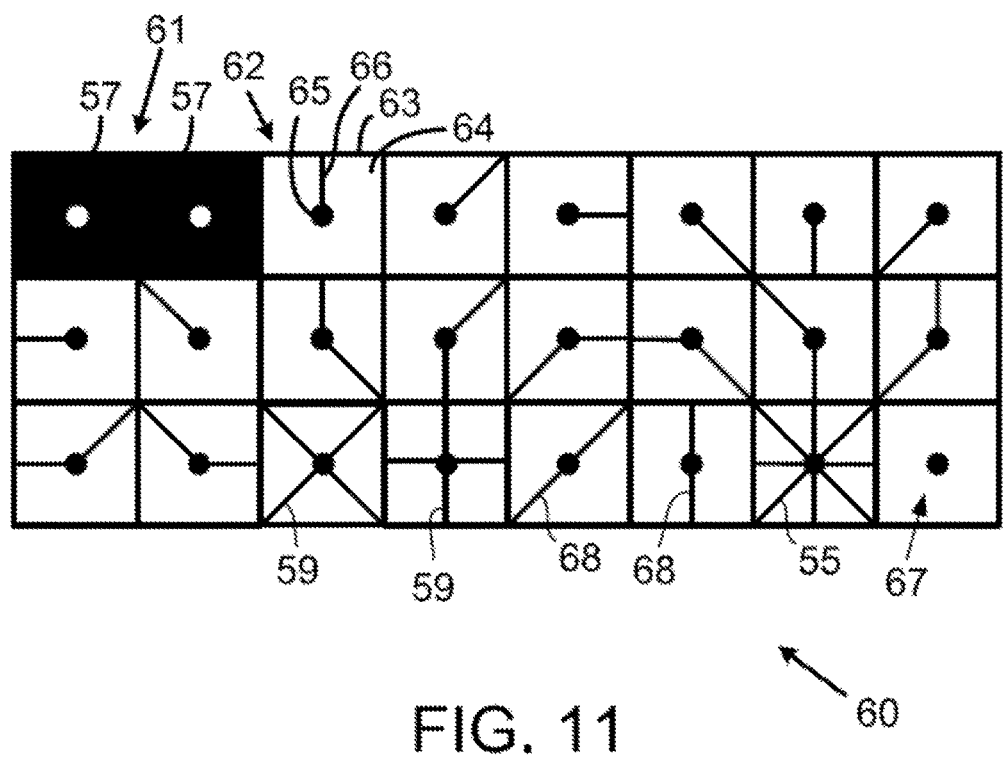
FIG. 11 illustrates a schematic representation of encoded cells with an alternative perimeter in accordance with one or more example embodiments.

In accordance with other example embodiments, the angular increments from a given reference direction for diametrical vectors can be other than 45° so as to provide a different number of cell states corresponding to a set of diametrical vectors. Diametrical vectors 68 passing through an alignment mark are also shown in FIG. 11.

Figure 4:
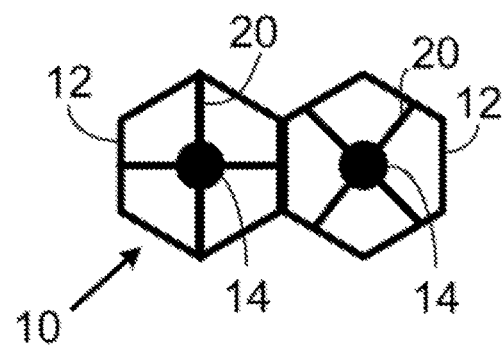
FIG. 4 illustrates additional states or line patterns of the encoded cell of FIG. 1 in accordance with one or more example embodiments.

Cell 10 can include another type of line pattern in the form of a symmetric cross 20 centred at alignment mark 14, as illustrated in FIG. 4. A symmetric cross can be referred to a "symmetric cross line pattern." In accordance with an example embodiment, symmetric cross 20 may be aligned in either of two possible directions in angular increments of 45° from a given reference direction, at angular positions of 0° or 45° from the reference direction. The addition of the symmetric cross 20 as another attribute of cell 10 defines another two states (e.g., states #14 and #15) of cell 10 which, on their own, can represent a single bit of embedded information, as illustrated in Table 3.

TABLE 3

| State | Angular Position | Binary Data |
|-------|------------------|-------------|
| #14 | 0° | 0 |
| #15 | 45° | 1 |

In accordance with other example embodiments, an angular increment from a given reference direction for symmetric crosses can be other than 45° so as to provide a different number of cell states using a set of symmetric crosses. Symmetric crosses 59 passing through an alignment mark are also shown in FIG. 11.

Figure 5:
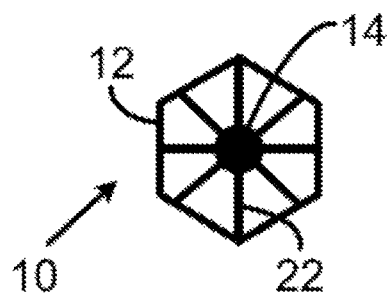
FIG. 5 illustrates another state or line pattern of the encoded cell of FIG. 1 in accordance with one or more example embodiments.

Cell 10 can include another type of line pattern in the form of a symmetrical star 22 centred on the alignment mark 14, as illustrated in FIG. 5. A symmetric star 55 passing through an alignment mark is also shown in FIG. 11. The use of symmetrical star 22 as another attribute of cell 10 defines an additional state (e.g., state #16) which, together with the empty-cell line 16 can represent a single bit of embedded information, as illustrated in Table 4.

TABLE 4

| State | Line Pattern | Binary Data |
|-------|--------------|-------------|
| #14 | Empty-cell | 0 |
| #15 | Star | 1 |

The different types of line patterns shown in FIG. 1 to FIG. 5 do not have to be used in isolation from each other or other line patterns. For example, it will be appreciated that the empty-cell line pattern 16 and corresponding cell state #1, the eight additional line patterns and corresponding cell states #2 to #9 defined by the asymmetric line patterns 17 of FIG. 2, the four additional line patterns and corresponding cell states #10 to #13 defined by the diametrical line patterns 18 of FIG. 3, the two additional line patterns and corresponding cell states #14 and #15 defined by the symmetric cross line pattern 20 of FIG. 4, and the line pattern and corresponding cell state #16 defined by the symmetrical star 22 of FIG. 5, in combination, result in 16 distinct line patterns and corresponding cell states. These 16 distinct line patterns can be used to encode a total of four bits of binary data, two octal digits, or one hexadecimal digit, as illustrated in Table 5.

TABLE 5

| State | Binary Data | Octal Data | Hexadecimal Data |
|---|---|---|---|
| #1 | 0000 | 00 | 0 |
| #2 | 0001 | 01 | 1 |
| #3 | 0010 | 02 | 2 |
| #4 | 0011 | 03 | 3 |
| #5 | 0100 | 04 | 4 |
| #6 | 0101 | 05 | 5 |
| #7 | 0110 | 06 | 6 |
| #8 | 0111 | 07 | 7 |
| #9 | 1000 | 10 | 8 |
| #10 | 1001 | 11 | 9 |
| #11 | 1010 | 12 | A |
| #12 | 1011 | 13 | B |
| #13 | 1100 | 14 | C |
| #14 | 1101 | 15 | D |
| #15 | 1110 | 16 | E |
| #16 | 1111 | 17 | F |

Each example line pattern illustrated in FIG. 2 to FIG. 5 includes at least one line within perimeter 12. A line is a continuous mark. The line patterns shown in FIG. 2 to FIG. 5 are straight lines, but the example embodiments are not so limited. FIG. 18 illustrates twelve example line patterns using curved lines. In particular, FIG. 18 shows twelve cells 10 including perimeter 12, alignment mark 14 within perimeter 12, and one of line patterns 91, 93, 95 and 97 within perimeter 12. Each of the line patterns shown in FIG. 18 can correspond to a distinct cell state.

Each line pattern 91 extends between two distinct locations (separated by $N_1$ degrees) on perimeter 12 and is tangential to alignment mark 14. Line pattern 91 can be referred to as a "single curved tangential line pattern."

Each line pattern 93 includes two curved lines that extend between two distinct locations (separated by $N_2$ degrees) on perimeter 12 and that are tangential to alignment mark 14. Line pattern 93 can be referred to as a "dual curved tangential line pattern." A person skilled in the art will understand that three or more curved lines tangential to alignment mark 14 and extending between two distinct locations on perimeter 12 could be included within a cell to provide additional cell states. In general, a line pattern with two more curved lines tangential to alignment mark 14 and extending between two distinct locations on perimeter 12 can be referred to as a "multiple curved tangential line pattern."

Each line pattern 95 includes a single curved line that extends between two distinct locations (separated by $N_3$ degrees) on perimeter 12 and that passes through alignment mark 14. Similarly, each line pattern 97 includes a single curved line that extends between two distinct locations (separated by $N_4$ degrees) on perimeter 12 and that passes through alignment mark 14. Line patterns 95 and 97 can be referred to as a "single curved pass-through line pattern." A person skilled in the will understand that two or more curved lines passing through alignment mark 14 and extending between two distinct locations on perimeter 12 could be included within a cell to provide additional cell states. In general, a line pattern with two more curved lines passing through alignment mark 14 and extending between two distinct locations on perimeter 12 can be referred to as a "multiple curved pass-through line pattern." One or more of $N_1, N_2, N_3,$ and $N_4$ can be 90°, 120°, 180° or another number of degrees.

For this description, a line, whether it is straight or curved is a continuous mark. A broken line is a non-continuous line, and is commonly referred to as a "dashed line." Any line pattern described herein or shown in the figures can be used with a broken line instead of a line (i.e., a continuous mark).

A perimeter of a cell, such as perimeter 12, can be configured to have a predetermined width referred to herein as a "perimeter width." A line of a line pattern can be configured to have a predetermined width referred to herein as a "line width."

In accordance with any embodiment described herein, the perimeter width for one or more cells in a cell array can be equal to the line width for those same one or more cells. As an example, the perimeter width and line width for a given cell can each equal 1 unit, 1.5 units, 2 units, 2.4 units, 3 units, or some other number of units. Units can, for example, be millimeters, centimeters, inches or some other units appropriate for measuring the width of an object.

In accordance with any embodiment described herein, the perimeter width for one or more cells in a cell array can be equal to the line width times a first width multiplier (i.e., a positive decimal greater than 1.0 or less than 1.0). Accordingly, the line width for those one or more cells in a cell array can be equal to the perimeter width times a second width multiplier that equals 1 divided by the first width multiplier. In accordance with these example embodiments, the perimeter width for a given cell can equal 1 unit, 1.5 units, 2 units, 2.4 units, 3 units, or some other number of units, and the line width for the given cell can equal the 1 unit, 1.5 units, 2 units, 2.4 units, 3 units, or some other number of units times the second width multiplier.

III. Colour Coding

An encoded cell, such as cell 10, can also include a colour attribute. For example, against a white background, the cell colours may comprise Black and the primary detectable colours of the visible spectrum, namely Red, Yellow, Green, Cyan, Blue, Magenta and Orange, i.e. a total of eight colours. These eight colour attributes can define an additional eight states of the encoded cell. On their own, these additional eight states can encode three bits of binary data, as illustrated in Table 6. A colour in Table 6 can be replaced by another colour. For example, Magenta can be replaced with Violet or another colour.

TABLE 6

| Colour # | Colour | Binary Data |
|---|---|---|
| 1 | Black | 000 |
| 2 | Red | 001 |
| 3 | Yellow | 010 |

TABLE 6-continued

| Colour # | Colour | Binary Data |
|---|---|---|
| 4 | Green | 011 |
| 5 | Cyan | 100 |
| 6 | Blue | 101 |
| 7 | Magenta | 110 |
| 8 | Orange | 111 |

The colour attribute of an encoded cell, such as cell 10, can be used to augment the data capacity of the cell. In one example, the colour of an encoded cell may be used to represent precursor data to the binary data represented by the line pattern of the cell. In particular, the colour of encoded cell 10 may be used to represent the most significant bits of a concatenation with the binary data represented by the line pattern. As an illustration, in the above example where encoded cell 10 can be presented in any one of 8 different colours, a blue encoded cell with cell state #5 representing binary data 011 (as illustrated by data in Table 1) will yield a concatenated bit pattern of the binary data 101011.

In an alternative arrangement, the binary data represented by the line pattern can be used to represent the most significant bits of a concatenation with the binary data represented by the cell colour. In the case of a blue encoded cell representing binary data 101 with cell state #5 representing binary data 011, a concatenated bit pattern of for this alternative arrangement would be the binary data 011101.

The colour attribute can also be used with a number of cell states other than the eight cell states identified in Table 2. For example, each of the 16 possible states of encoded cell 10 illustrated in FIG. 1 to FIG. 5 can be displayed or printed in any of the 8 colours identified in Table 6. The 16 cell states (i.e., states #1 to #16) of encoded cell 10 and the cell colours (colours #1 to #8) of encoded cell 10 can be used to encode 7 bits of binary data, which is equivalent to octal (base 8) numbers ranging from the octal data 000 to the octal data 177, inclusive. This encoding scheme can, for example, be used to represent characters in a typical ASCII table with 128 characters. Table 7 shows an example in which the colour of each encoded cell can represent three most significant bits of the binary data and the cell states #1 to #16 can represent the least significant bits of the binary data. Other examples of using the cell states and cell colours to represent binary data or a range of octal numbers are also possible.

TABLE 7

| Colour # | Cell State | Binary Data | Octal Number |
|---|---|---|---|
| 1 | 1 | 000 0000 | 000 |
| 1 | 2 | 000 0001 | 001 |
| 1 | 3 | 000 0010 | 002 |
| 1 | 4 | 000 0011 | 003 |
| 1 | 5 | 000 0100 | 004 |
| 1 | 6 | 000 0101 | 005 |
| 1 | 7 | 000 0110 | 006 |
| 1 | 8 | 000 0111 | 007 |
| 1 | 9 | 000 1000 | 010 |
| 1 | 10 | 000 1001 | 011 |
| 1 | 11 | 000 1010 | 012 |
| 1 | 12 | 000 1011 | 013 |
| 1 | 13 | 000 1100 | 014 |
| 1 | 14 | 000 1101 | 015 |
| 1 | 15 | 000 1110 | 016 |
| 1 | 16 | 000 1111 | 017 |
| 2 | 1 | 001 0000 | 020 |
| 2 | 2 | 001 0001 | 021 |
| 2 | 3 | 001 0010 | 022 |
| 2 | 4 | 001 0011 | 023 |
| 2 | 5 | 001 0100 | 024 |
| 2 | 6 | 001 0101 | 025 |
| 2 | 7 | 001 0110 | 026 |
| 2 | 8 | 001 0111 | 027 |
| 2 | 9 | 001 1000 | 030 |
| 2 | 10 | 001 1001 | 031 |
| 2 | 11 | 001 1010 | 032 |
| 2 | 12 | 001 1011 | 033 |
| 2 | 13 | 001 1100 | 034 |
| 2 | 14 | 001 1101 | 035 |
| 2 | 15 | 001 1110 | 036 |
| 2 | 16 | 001 1111 | 037 |
| 3 | 1 | 010 0000 | 040 |
| 3 | 2 | 010 0001 | 041 |
| 3 | 3 | 010 0010 | 042 |
| 3 | 4 | 010 0011 | 043 |
| 3 | 5 | 010 0100 | 044 |
| 3 | 6 | 010 0101 | 045 |
| 3 | 7 | 010 0110 | 046 |
| 3 | 8 | 010 0111 | 047 |
| 3 | 9 | 010 1000 | 050 |
| 3 | 10 | 010 1001 | 051 |
| 3 | 11 | 010 1010 | 052 |
| 3 | 12 | 010 1011 | 053 |
| 3 | 13 | 010 1100 | 054 |
| 3 | 14 | 010 1101 | 055 |
| 3 | 15 | 010 1110 | 056 |
| 3 | 16 | 010 1111 | 057 |
| 4 | 1 | 011 0000 | 060 |
| 4 | 2 | 011 0001 | 061 |
| 4 | 3 | 011 0010 | 062 |
| 4 | 4 | 011 0011 | 063 |
| 4 | 5 | 011 0100 | 064 |
| 4 | 6 | 011 0101 | 065 |
| 4 | 7 | 011 0110 | 066 |
| 4 | 8 | 011 0111 | 067 |
| 4 | 9 | 011 1000 | 070 |
| 4 | 10 | 011 1001 | 071 |
| 4 | 11 | 011 1010 | 072 |
| 4 | 12 | 011 1011 | 073 |
| 4 | 13 | 011 1100 | 074 |
| 4 | 14 | 011 1101 | 075 |
| 4 | 15 | 011 1110 | 076 |
| 4 | 16 | 011 1111 | 077 |
| 5 | 1 | 100 0000 | 100 |
| 5 | 2 | 100 0001 | 101 |
| 5 | 3 | 100 0010 | 102 |
| 5 | 4 | 100 0011 | 103 |
| 5 | 5 | 100 0100 | 104 |
| 5 | 6 | 100 0101 | 105 |
| 5 | 7 | 100 0110 | 106 |
| 5 | 8 | 100 0111 | 107 |
| 5 | 9 | 100 1000 | 110 |
| 5 | 10 | 100 1001 | 111 |
| 5 | 11 | 100 1010 | 112 |
| 5 | 12 | 100 1011 | 113 |
| 5 | 13 | 100 1100 | 114 |
| 5 | 14 | 100 1101 | 115 |
| 5 | 15 | 100 1110 | 116 |
| 5 | 16 | 100 1111 | 117 |
| 6 | 1 | 101 0000 | 120 |
| 6 | 2 | 101 0001 | 121 |
| 6 | 3 | 101 0010 | 122 |
| 6 | 4 | 101 0011 | 123 |
| 6 | 5 | 101 0100 | 124 |
| 6 | 6 | 101 0101 | 125 |
| 6 | 7 | 101 0110 | 126 |
| 6 | 8 | 101 0111 | 127 |
| 6 | 9 | 101 1000 | 130 |
| 6 | 10 | 101 1001 | 131 |
| 6 | 11 | 101 1010 | 132 |
| 6 | 12 | 101 1011 | 133 |
| 6 | 13 | 101 1100 | 134 |
| 6 | 14 | 101 1101 | 135 |
| 6 | 15 | 101 1110 | 136 |

TABLE 7-continued

| Colour # | Cell State | Binary Data | Octal Number |
|---|---|---|---|
| 6 | 16 | 101 1111 | 137 |
| 7 | 1 | 110 0000 | 140 |
| 7 | 2 | 110 0001 | 141 |
| 7 | 3 | 110 0010 | 142 |
| 7 | 4 | 110 0011 | 143 |
| 7 | 5 | 110 0100 | 144 |
| 7 | 6 | 110 0101 | 145 |
| 7 | 7 | 110 0110 | 146 |
| 7 | 8 | 110 0111 | 147 |
| 7 | 9 | 110 1000 | 150 |
| 7 | 10 | 110 1001 | 151 |
| 7 | 11 | 110 1010 | 152 |
| 7 | 12 | 110 1011 | 153 |
| 7 | 13 | 110 1100 | 154 |
| 7 | 14 | 110 1101 | 155 |
| 7 | 15 | 110 1110 | 156 |
| 7 | 16 | 110 1111 | 157 |
| 8 | 1 | 111 0000 | 160 |
| 8 | 2 | 111 0001 | 161 |
| 8 | 3 | 111 0010 | 162 |
| 8 | 4 | 111 0011 | 163 |
| 8 | 5 | 111 0100 | 164 |
| 8 | 6 | 111 0101 | 165 |
| 8 | 7 | 111 0110 | 166 |
| 8 | 8 | 111 0111 | 167 |
| 8 | 9 | 111 1000 | 170 |
| 8 | 10 | 111 1001 | 171 |
| 8 | 11 | 111 1010 | 172 |
| 8 | 12 | 111 1011 | 173 |
| 8 | 13 | 111 1100 | 174 |
| 8 | 14 | 111 1101 | 175 |
| 8 | 15 | 111 1110 | 176 |
| 8 | 16 | 111 1111 | 177 |

IV. Fault Tolerance

In order for an encoded cell 10 shown in FIG. 1 to FIG. 5 to be used successfully in a cell array, it can be important for the encoded cell to be scanned (i.e. "read") and decoded successfully and reliably. If encoded cell 10 is noisy, the possibility of erroneous scanning and decoding increases. A noisy cell can arise, for example, if it is printed by a poor quality printer or displayed on a low-resolution display device.

The various states of encoded cells 10 shown in FIG. 1 to FIG. 5 exhibit different degrees of fault tolerance (or "noise tolerance"), i.e. the ability to be reliably scanned and decoded in the presence of noise. The most fault tolerant set of encoded cell states can be the set of eight cell states #2 to #9 illustrated in FIG. 2. For convenience, this level of noise tolerance will be referred to as Level I noise tolerance. The line pattern 17 in each of these Level I states is asymmetric in nature and, as a result, a noisy cell in each one of these states can be read or decoded with least probability of error.

The next most noise tolerant set of encoded cell states can be the set of four cell states #10 to #13 illustrated in FIG. 3, in which the diametrical line pattern 18 in each of these states is symmetrical. This level of noise tolerance will be referred to as Level II noise tolerance. Thus, it can be possible for a noisy Level I cell state to be erroneously scanned and decoded as a Level II cell state.

Less fault tolerance still can be the set of two encoded cell states #14 and #15 illustrated in FIG. 4 (referred to as level III noise tolerance), and least fault tolerant of all (for the 16 cell states of FIG. 1 to FIG. 5) can be the set comprising the cell state #16 of FIG. 5 and the empty cell (state #1) of FIG. 1 (referred to as level IV noise tolerance).

Consequently, a "high definition" encoded cell that contains little or no noise may use all 16 possible cell states (i.e., states #1 to #16, which are the Level I, II, III and IV sets of encoded cell states). As previously described, without considering cell colour, an encoded cell 10 that can use 16 states can encode 4 bits of binary data, as shown in Table 5. On the other hand, if an encoded cell is noisy, it may use only the 8 line patterns for cell states #2 to #9 with Level I noise tolerance. In so doing, without consideration of cell colour, each encoded cell 10 would be able to encode three bits of binary data, as shown in Table 1. Thus, there can be a trade-off between encoded cell capacity and encoded cell noise.

V. Alternative Cell Line Patterns

FIG. 1 and FIG. 3 to FIG. 5 illustrate instances of encoded cell 10 that have symmetrical line patterns. FIG. 2 illustrates use of a single asymmetrical line pattern 17 in each instance of encoded cell 10. Encoded cell 10, however, is not limited to the instances of asymmetrical line patterns shown in FIG. 2. For example, encoded cell 10 can include a line pattern with two or more lines arranged asymmetrically.

Figure 8:
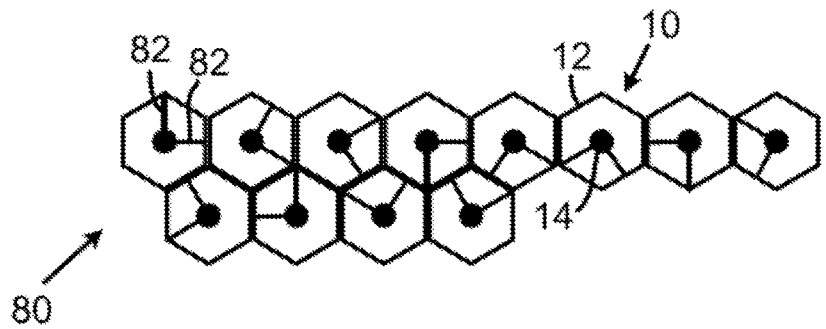
FIG. 8 illustrates additional states or line patterns of the encoded cell of FIG. 1 in accordance with one or more example embodiments.

FIG. 8 illustrates a cell array 80 including twelve instances of cell 10 including asymmetrical line patterns 82. In FIG. 8, each cell 10 includes an asymmetrical line pattern 82 with a pair of lines separated by 90 degrees, when considering the least amount of degrees separating the pair of lines. The lines of asymmetrical line patterns 82 of cell array 80 may be aligned in any one of twelve pairs of possible directions in angular increments of 30° from a given reference direction, namely at angular positions of 0° and 90°, 30° and 120°, 60° and 150°, 90° and 180°, 120° and 210°, 150° and 240°, 180° and 270°, 210° and 300°, 240° and 330°, 270° and 0°, 300° and 30°, and 330° and 60° from the reference direction, as shown in FIG. 8 (starting with the left most top cell and moving left to right in each row). An encoded cell 10 with an asymmetrical line pattern, such as asymmetrical line patterns 82, can be Level II noise tolerant.

The encoded cells 10 shown in FIG. 8 can be defined as additional states of encoded cell 10. Staring in the top row, moving from left to right in each row in FIG. 8, the encoded cells can be defined to have cell states #17 to #28. Various attributes can be associated with cell states #17 to #28. For example, Table 8 shows cell states #17 to #24 can be associated with 3 bits of binary data, and cell states #25 to #28 can be associated with decoding instructions for use by a computing device (e.g., a scanner or decoder) scanning a cell array. In an alternative arrangement, one or more of cell states #17 to #28 can be associated with a decoding instruction indicating a start of a cell array row or a start of a cell array. Such decoding cells can be used with a cell array using different cell colours or with an encoded cell using a single cell colour.

TABLE 8

| State # | Binary Data | Decoding instruction |
|---|---|---|
| #17 | 000 | N.A. |
| #18 | 001 | N.A. |
| #19 | 010 | N.A. |
| #20 | 011 | N.A. |
| #21 | 100 | N.A. |
| #22 | 101 | N.A. |
| #23 | 110 | N.A. |
| #24 | 111 | N.A. |
| #25 | N.A. | End of row |

TABLE 8-continued

| State # | Binary Data | Decoding instruction |
| --- | --- | --- |
| #26 | N.A. | End of array |
| #27 | N.A. | Pitch #1 |
| #28 | N.A. | Pitch #2 |

Eight cell states within cell states #17 to #28 (e.g., cell states #17 to #24) can be combined with cell states #2 to #9 to be able to encode four bits of binary data as shown in Table 9. These cells states shown in Table 9 are Level II noise tolerant. It will be appreciated that various sets of sixteen encoded cells can be defined to encode four bits of binary data.

TABLE 9

| State | Binary Data |
| --- | --- |
| #2 | 0000 |
| #3 | 0001 |
| #4 | 0010 |
| #5 | 0011 |
| #6 | 0100 |
| #7 | 0101 |
| #8 | 0110 |
| #9 | 0111 |
| #17 | 1000 |
| #18 | 1001 |
| #19 | 1010 |
| #20 | 1011 |
| #21 | 1100 |
| #22 | 1101 |
| #23 | 1110 |
| #24 | 1111 |

VI. Alternative Alignment Marks

Figure 9:
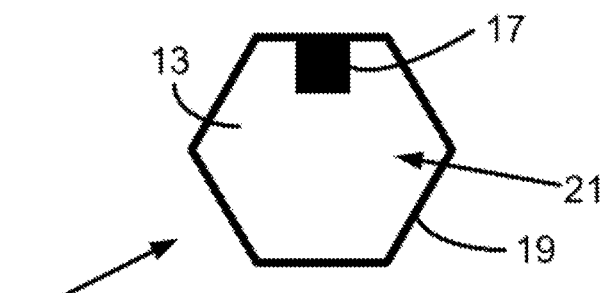
FIG. 9 is a schematic representation of an encoded cell with an alternative alignment mark in accordance with one or more example embodiments.

Next, FIG. 9 illustrates an alternative version of an encoded cell 15 with an empty-cell line pattern. As shown in FIG. 9, encoded cell 15 includes a perimeter 19, an alignment mark 17 within perimeter 19, and a line pattern 13 within perimeter 19. Alignment mark 17 is an offset alignment mark that can be offset from a centre of encoded cell 15 or that is within an encoded cell that does not include a defined centre. Alignment mark 17 may be represented as a quadrilateral (e.g., a rectangle), as shown in FIG. 2, but is not so limited.

Alignment marks 14 and 17, shown in FIG. 1 and FIG. 9, respectively, are shown as filled alignment marks, but an alignment mark of an encoded cell can, alternatively, be an unfilled alignment mark or a partially-filled mark. Furthermore, an alignment mark can be represented as a shape other than a circle or a quadrilateral, such as a triangle, a pentagon, a hexagon, an octagon, or some other shape.

VII. Cell Arrays

Figure 10:
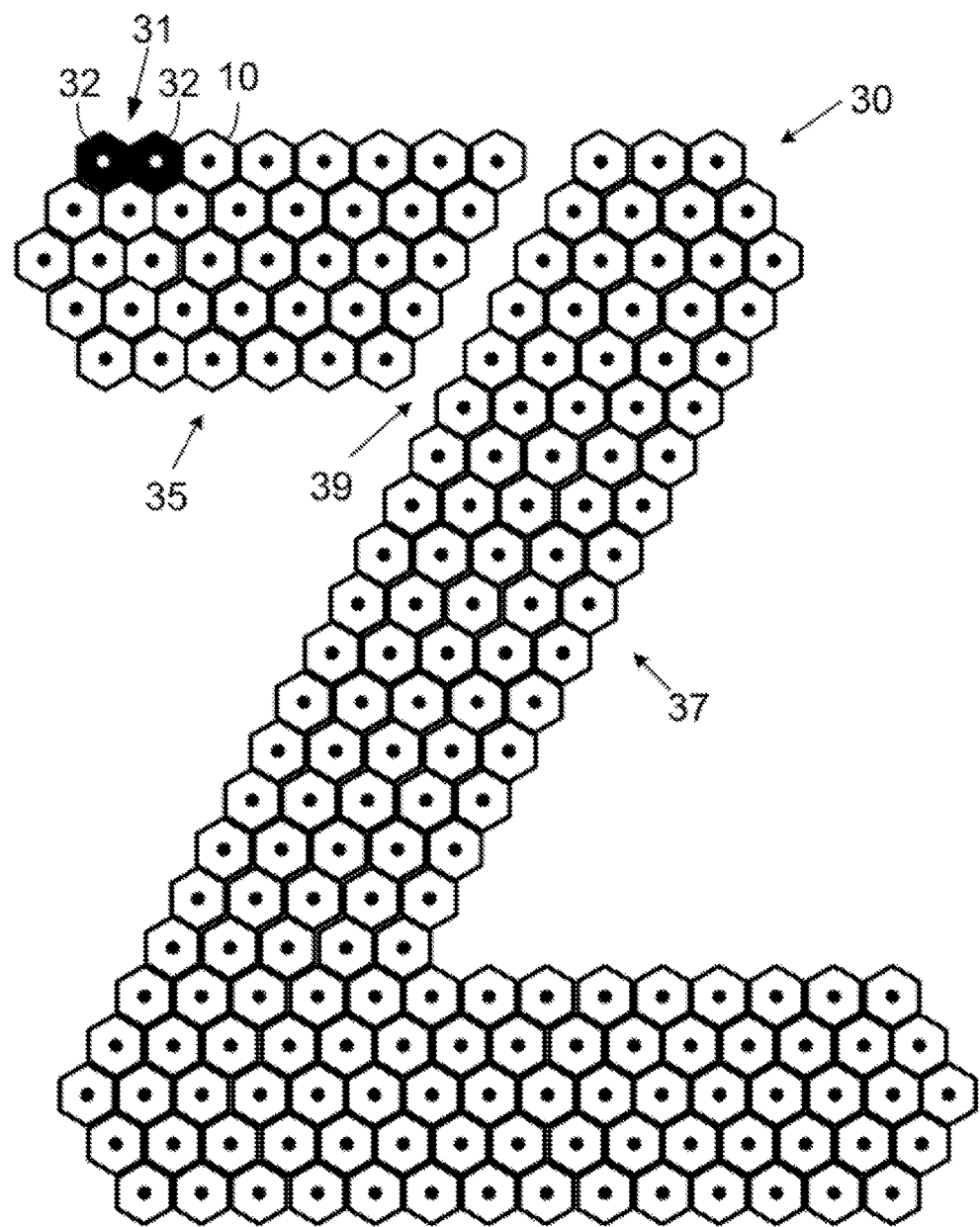
FIG. 10 illustrates a cell array in accordance with one or more example embodiments.
Figure 20:
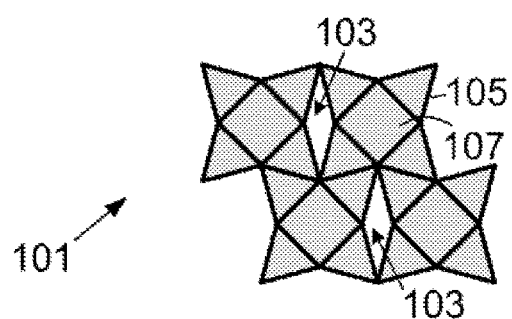
FIG. 20 illustrates features of a cell array in accordance with one or more example embodiments.

Cell arrays can be arranged in a variety of configurations. In one respect, a cell array can be arranged in a configuration in which all of the cells (and the cell perimeters) are the same shape. Cell array 30 shown in FIG. 10 is an example of a cell array in which all of the cells are the same shape. Alternatively, a cell array can be arranged in a configuration in which the cell array includes at least two different shaped cells (and perimeters). FIG. 20 shows a cell array 101 or a portion of cell array that includes triangle shaped cells 105 and square shaped cells 107. Triangle shaped cells 105 can be configured like triangle shaped cells 77 discussed with respect to FIG. 12, and square shaped cells 107 can be configured like rectangular shaped cells discussed with respect to FIG. 11. Other examples of a cell array including at least two different shaped cells are also possible.

In another respect, a cell array can include non-cellular space between multiple cells that abut one another. FIG. 20 illustrates non-cellular spaces 103 between multiple cells of cell array 101. If a cell array with non-cellular space between adjacent cells in the cell array is acceptable or preferred, then the cell array can include cells with perimeters having curved lines, such as, but not limited to a circular perimeter, an oval perimeter, or an elliptical perimeter.

Figure 19:
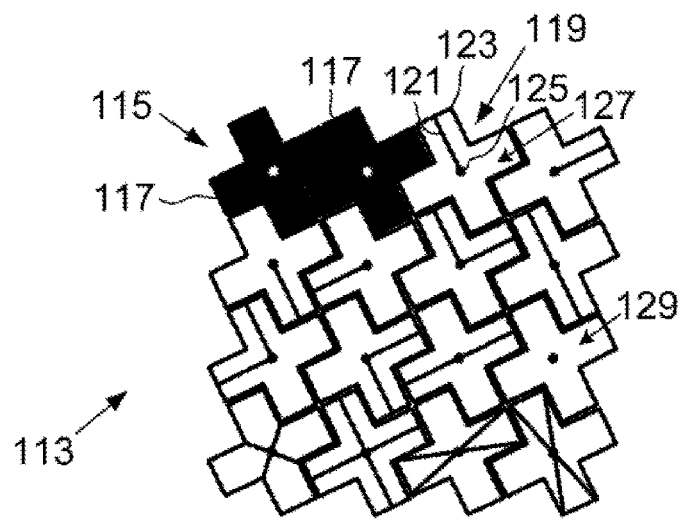
FIG. 19 illustrates a schematic representation of additional encoded cells in accordance with one or more example embodiments.

In another respect, a cell array can include multiple cells that are closely packed together without any non-cellular spaces and without any gaps. FIG. 19 illustrates a cell array 113 including multiple cross-shaped cells 115 that are closely packed together without any non-cellular spaces and without any gaps.

In yet another respect, a cell array can include a set of closely-packed cells arranged in a specific pattern depicting a desired shape, logo, configuration or the like. FIG. 10 illustrates a cell array 30. Cell array 30 includes a plurality of cells 10 grouped together in a closely-packed arrangement, similar to that of a honeycomb. Cell array 30 includes a plurality of hexagonal-shaped cells arranged as the letter "Z". Non-hexagonal shaped encoded cells can also be grouped together closely-packed, or otherwise, to form a cell array arranged as the letter "Z" or otherwise.

Figure 7:
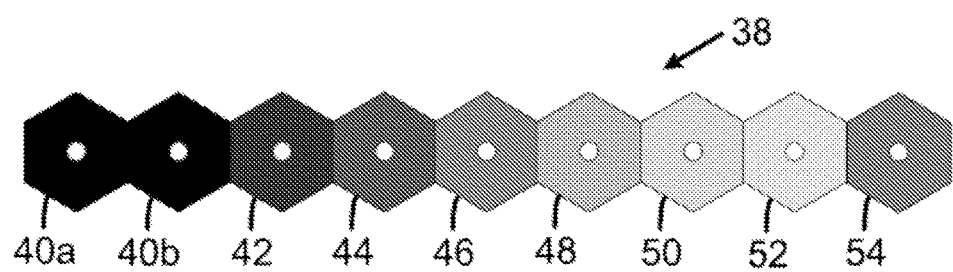
FIG. 7 illustrates another alignment node for use in a cell array in accordance with one or more example embodiments.

Cell array 30 includes an alignment node 31, and 191 instances of cell 10. For clarity of FIG. 10, only one instance of cell 10 is labeled and each instance of cell 10 is shown with the empty-cell line pattern 16. A person skilled in the art will understand that each cell 10 within cell array 30 can include any of the described line patterns or another line pattern. Alignment node 31 includes two adjacent null cells 32. In an alternative arrangement, cell array 30 could be configured with alignment node 38 as shown in FIG. 7.

Cell array 30 includes a first portion 35, a second portion 37, and a gap 39 separating first portion 35 and second portion 37. Alignment node 31 and encoded cells 10 of first portion 35 can be a first colour, such as cyan. The encoded cells 10 of second portion 37 can be a second colour, such as navy blue. A cell array can include more or fewer gaps separating distinct portions of the cell array. Each separate portion of a cell array can include an alignment node for that portion of the cell array. Alternatively, a separate portion, such as second portion 37, may not include an alignment node.

Figure 13:
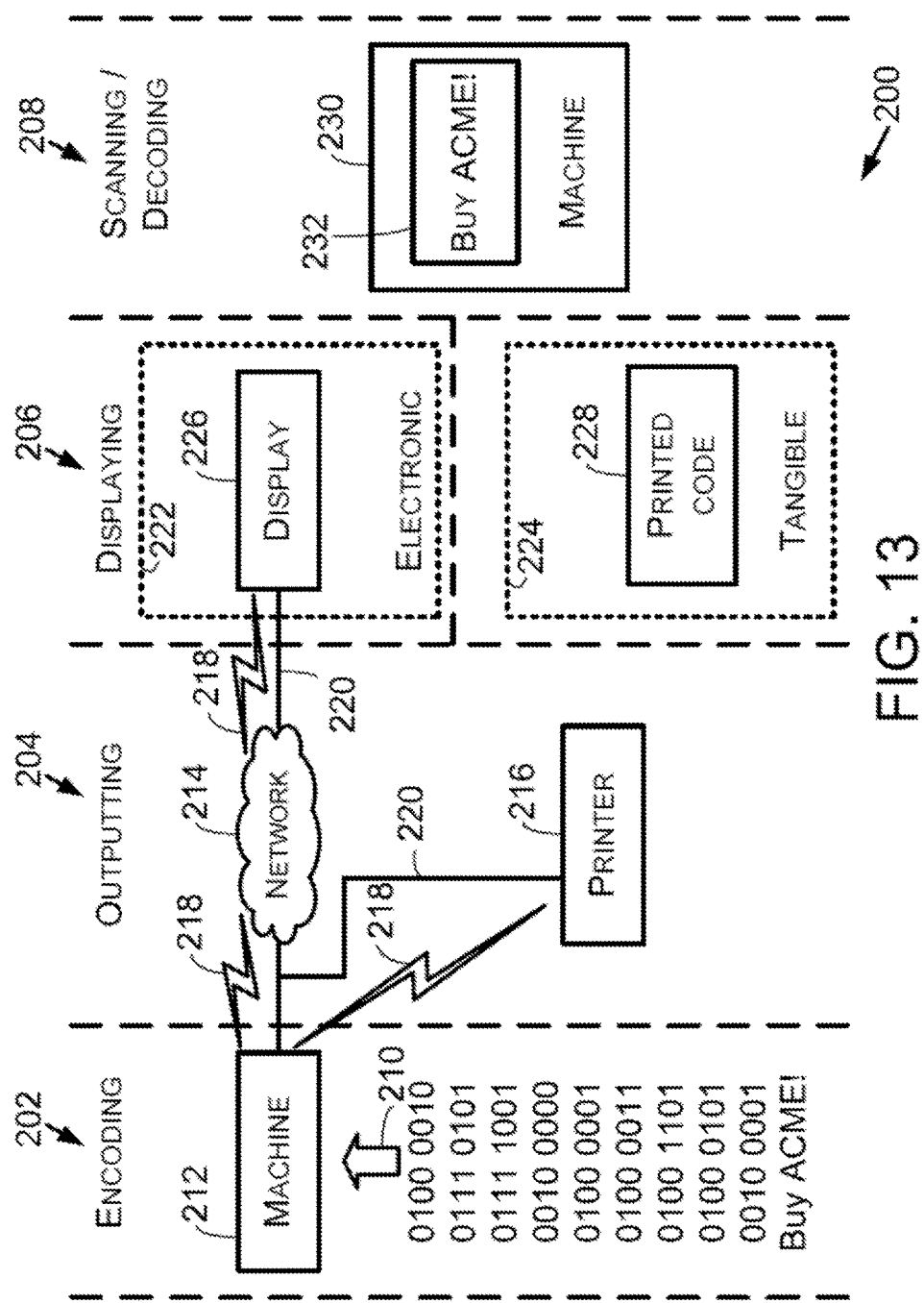
FIG. 13 is a block diagram showing an example system in accordance with one or more example embodiments.

A machine, such as machine 212 shown in FIG. 13, can be configured to generate gap 39 with a known dimension (e.g., a known width, such as a width of cell 10 within cell array 30) so that a machine (e.g., a machine configured to decode cells and cell arrays) can detect adjacent nodes of two portions of cell array. For example, a distance between distinct portions (e.g., the alignment marks 14) of two cells may be defined for a cell array. This distance may be referred to as a "pitch." A cell array may be defined to have a standard pitch for adjacent encoded cells that abut one another and a maximum pitch for adjacent cells separated by a gap. The maximum pitch, for example, could equal the pitch times a pitch variable, such as 2. A machine (e.g., a machine configured to scan or decode cells or a cell array) can be configured to detect an end of a cell array row or an end of the encoded cell array if the machine does not detect any encoded cells within a distance equal to the maximum pitch relative to a previously scanned encoded cell.

An input including one or more encoding scheme selections can be provided to a machine for generating a cell array, such as cell array 30. As an example, the encoding scheme selections can include, but are not limited to, a colour selection for one or more encoded cells, a size of one or more encoded cells, one or more dimensions of the cell array (e.g., a height, length, or width), a shape of the cell array, a gap selection, and the data to be encoded within the encoded cells.

A machine that generates a cell array, such as machine 212 shown in FIG. 13, can be configured to generate cell arrangement data, such as the example cell arrangement data shown in Table 10. The example cell arrangement data can indicate, for each cell in a cell array, one or more of the following items: a cell number, a cell position, a cell type, a cell state, and a cell colour. In Table 10, the indicator "***" indicates cell arrangement data for cell array 30 not included in Table 10. The cell positions can, for example, be specified by a row indicator and a position indicator. As an example the left-most position in a row can be position 1, 1L or 1R. Position 1L indicates a position to the left of the first position in a preceding row. Position 1R indicates a position to the right of the first position in a preceding row. Table 10 indicates example cells types, cell states, and cell colours of cells that can be included within cell array 30. The cell type of cell number 9 is indicated as a gap for including gap 39 of cell array 30. Table 10 shows cell array 30 includes 198 cells. Those cells include 2 null cells 32, 191 cells 10, and 5 gap cells (i.e., 1 gap cell in each row of the top 5 rows.

TABLE 10

| Cell # | Cell Position | Cell Type | Cell State | Cell Colour |
|---|---|---|---|---|
| 1 | Row 1, Position 1 | Alignment #1 | N.A. | #5 |
| 2 | Row 1, Position 2 | Alignment #2 | N.A. | #5 |
| 3 | Row 1, Position 3 | Encoded | #2 | #5 |
| 4 | Row 1, Position 4 | Encoded | #4 | #5 |
| *** | *** | *** | *** | *** |
| 9 | Row 1, Position 9 | Gap | N.A. | N.A. |
| *** | *** | *** | *** | *** |
| 12 | Row 1, Position 12 | Decoding | End of Row | #6 |
| 13 | Row 2, Position 1L | Encoded | #6 | #6 |
| 14 | Row 2, Position 2 | Encoded | #8 | #6 |
| *** | *** | *** | *** | *** |
| 197 | Row 22, Position 13 | Layout | N.A. | #6 |
| 198 | Row 22, Position 14 | Decoding | End of Array | #6 |

VIII. Alignment Node

Alignment node 31 of cell array 30 can indicate a first portion of cell array 30 to be scanned or a first portion of cell array 30 to be decoded. With cell array 30 arranged as shown in FIG. 10, alignment node 31 is at a top and left side of cell array 30. Cell array 30 can, however, be rotated a number of degrees greater than 0° and a machine, such as machine 230, can still use alignment node 31 to determine a start point for scanning and decoding cell array 30.

Figure 6:
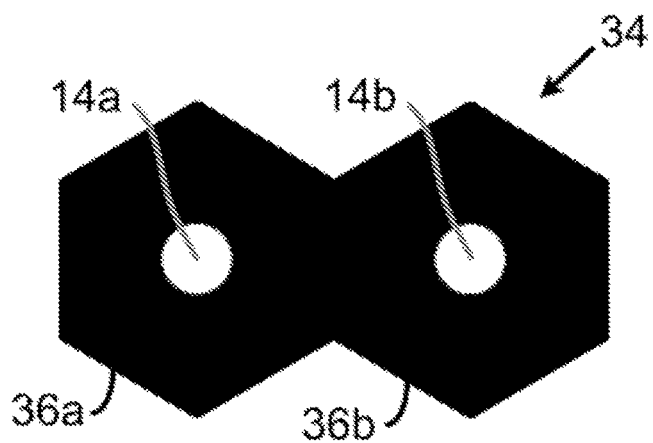
FIG. 6 illustrates an alignment node for use in a cell array in accordance with one or more example embodiments.

Next, FIG. 6 illustrates an alignment node 34 that may be used in conjunction with a cell array composed of cells without a colour attribute. Alignment node 34 can be a starting node or an ending node. Alignment node 34 can include two identical, adjacent alignment cells 36a and 36b. A cell body of alignment cells 36a and 36b can be the inverse of the cell body of a cell 10 with an empty-cell line pattern 16, as shown in FIG. 1. In other words, alignment marks 14a, 14b at the centre of alignment cells 36a and 36b are white instead of black, and the other portions of the cell body within the perimeter of alignment cells 36a and 36b are totally black instead of white. At least one of the cell bodies within alignment cells 36a and 36b can be a colour other than black or white. For convenience, an alignment cell, such as alignment cells 36a and 36b, can be referred to as a null cell. When alignment node 34 is scanned by a machine, such as machine 230, the machine can use alignment mark 14a to locate a centre of the first alignment cell 36a, and the distance between alignment marks 14a and 14b of the adjacent alignment cells to determine the pitch between adjacent encoded cells of a cell array, such as cell array 30, or to determine a maximum pitch by multiplying the detected pitch by a pitch variable.

Next, FIG. 7 illustrates an alignment node 38 for a cell array including a colour attribute. The alignment node 38 includes an ordered string of adjacent null cells, one in each permissible colour of encoded cell 10, with two adjacent instances of the leading null cell. Thus, as illustrated in FIG. 7, where permissible colours of encoded cell 10 are as previously described, the alignment node 38 includes a string of nine adjacent null cells in the following order: two black null cells 40a and 40b followed by one null cell in each of the following colours—Red 42, Yellow 44, Green 44, Cyan 46, Blue 50, Magenta 52 and Orange 54. As previously described, when the alignment node 38 is scanned, the scanner may use the distance between the alignment marks of the black null cells 40a and 40b to determine the pitch between adjacent cells of a cell array. Furthermore, the scanner may use the predetermined order of the coloured null cells 42 to 54 to perform a colour calibration of the machine itself.

A machine 230 (e.g., a scanning machine (i.e., a scanner)) may analyse a scanned alignment node to determine whether the cell array to which it applies is a monochrome encoded cell or whether it is composed of encoded cells 10 that have a colour attribute. For example, if the first two scanned encoded cells are null cells and the third cell is not a null cell, then the alignment node is as indicated by reference numeral 34 of FIG. 6 and the cell array to which the alignment node 34 pertains is to be treated as a monochrome encoded cell, irrespective of the colour or colours in which it is displayed. If, on the other hand the first two scanned encoded cells are null cells and so is the third, then the alignment node can be as indicated by reference numeral 38 of FIG. 7 and the cell array 30 can be composed of cells 10 that have a colour attribute.

IX. Encoded Cell Capacity

As previously described, a set of encoded cells 10 at Level I noise tolerance that use only cell states #2 to #9, as illustrated in FIG. 2, in monochrome, can encode 3 bits of binary data, as illustrated in Table 1.

The use of cell states #1 to #16, as illustrated in FIG. 1 to FIG. 5, in monochrome, can increase the encoded cell capacity to 4 bits of digital data, as illustrated in Table 5.

The addition of a colour attribute, as described with 8 distinct colours, can increase the encoded cell capacity by 3 bits, to 6 bits at Level I noise tolerance, and to 7 bits per cell using the lower noise tolerance levels, as illustrated in Table 7.

X. Example Machines and System Architectures

Next, FIG. 13 is a block diagram showing an example system 200 in accordance with an example embodiment. In general, system 200 includes an encoding stage 202, an outputting stage 204, a displaying stage 206, and a scanning or decoding stage 208. System 200 can include a machine, such as a machine 212 or 230, a machine including a printer 216, or a machine including display 226. Each element shown in FIG. 13 is not restricted to operating within the stage 202, 204, 206, or 208 that includes that element. In encoding stage 202, input 210 is provided to machine 212.

Input 210 can include data to be encoded by machine 212. As an example, input 210 can include a binary identifier, such as the binary data "0100 0010 to 0010 0001" shown in FIG. 13. The example binary identifier shown in FIG. 13 represents the ASCII values for the text "Buy ACME!" Receiving a binary identifier can include receiving data that machine 212 can convert to binary data. For instance, machine 212 can receive hexadecimal equivalents for the binary data shown in FIG. 13 (i.e., the hexadecimal data 42, 75, 79, 20, 41, 43, 4 D, 45, and 21) and convert the hexadecimal values to equivalent binary values. As another example, machine 212 can receive text, such as "Buy ACME!" convert the text to ASCII values, and then convert the ASCII values to equivalent binary values.

Input 210 can include one or more encoding scheme selections. An encoding scheme selection can, for example, include a cell shape selection, a cell colour selection, a cell array colour selection, or a layout selection for generating a cell array. Other examples of an encoding scheme selection are also possible.

Machine 212 can encode a portion of input data 210 (e.g., the binary identifier portion of input data 210) as a cell array. Encoding a portion of input data 210 can include converting a portion of input data 210 based on an ASCII table. Converting the portion of input data 210 can include converting text, such as "Buy ACME!," to the binary values equivalent to ASCII values representing the "Buy ACME!" text. Machine 212 can encode the binary values obtained by converting the portion of input data 210 into a cell array based on an encoding scheme selection.

Machine 212 can output (e.g., provide or transmit) a cell array to an element of outputting stage 204. Outputting a cell array can include outputting encoded cells of the cell array one at a time or two or more at a time. Outputting a cell array or an encoded cell can include outputting data indicating the cell array or encoded cell, respectively. Outputting stage 204 can include elements such as network 214 and printer 216. Outputting the data indicating the cell array can include transmitting an encoding scheme 268 or encoding scheme data. Outputting the data indicating the cell array can include transmitting a data representation of a cell of the cell array. Machine 212 can provide the cell array (or the data indicating the cell array) to network 214 and printer 216 over a wireless communication link 218 or a wired communication link 220.

Wireless communication link 218 can be configured according to any of a variety of wireless communication protocols, such as an IEEE 802.11 protocol, such as the protocol commonly referred to as Wi-Fi. Wired communication link 220 can be configured according to any of a variety of wired communication protocols, such as the protocol commonly referred to as Ethernet. A communication link (not shown) can include both a wireless communication link and a wired communication link.

Network 214 can include a local area network or a wide area network, such as the Internet. Network 214 can include wireless communication links 218 and wired communication links 220. Printer 216 can include a laser printer, a dot matrix printer, an inkjet printer, but is not so limited. Printer 216 can be configured to print an instance of an encoded cell or cell array on a surface of an article of manufacture.

Displaying stage 206 can include an electronic segment 222 and a tangible segment 224. Electronic segment 222 can include a display 226. Network 214 can transport an encoded cell or a cell array (or the data indicating the encoded cell or cell array) to display 226 over a communication link, such as wireless communication link 218 or wired communication link 220. Display 226 can include any of a variety of electronic displays, such as, but not limited to, a light emitting diode (LED) display, a plasma display, a cathode ray tube (CRT) display, or a liquid crystal display (LCD). Display 226 can include a display within a kiosk, such as a kiosk at a shopping mall, airport, or a museum. Display 226, which can be referred to as a "display device," can be embodied within a machine, such as a machine 248 shown in FIG. 14.

Displaying an encoded cell or a cell array within displaying segment 206 can include providing a tangible instance of the encoded cell or a tangible instance of the cell array. The tangible instances of the encoded cell or cell array can be generated by printer 216 printing the encoded cell or cell array, or by another means, such as but not limited to, painting, engraving, etching, dyeing, or silk printing. A tangible instance of an encoded cell or a cell array can be generated on a surface of an article of manufacture including any of a variety of media, such as but not limited to, paper, plastic, clothing, a metal, a ceramic material, or cardboard.

Scanning or decoding stage 208 can include a machine 230 configured to scan an encoded cell or a cell array provided within displaying stage 206. Machine 230 can decode the cell or the cell array to recover the input data encoded into the encoded cell or the cell array, respectively. For example, machine 230 can recover the input text "Buy ACME!" and provide the recovered data to a display 232 for displaying the recovered data. Additional details regarding aspects shown in FIG. 13 are described elsewhere in this description.

Figure 14:
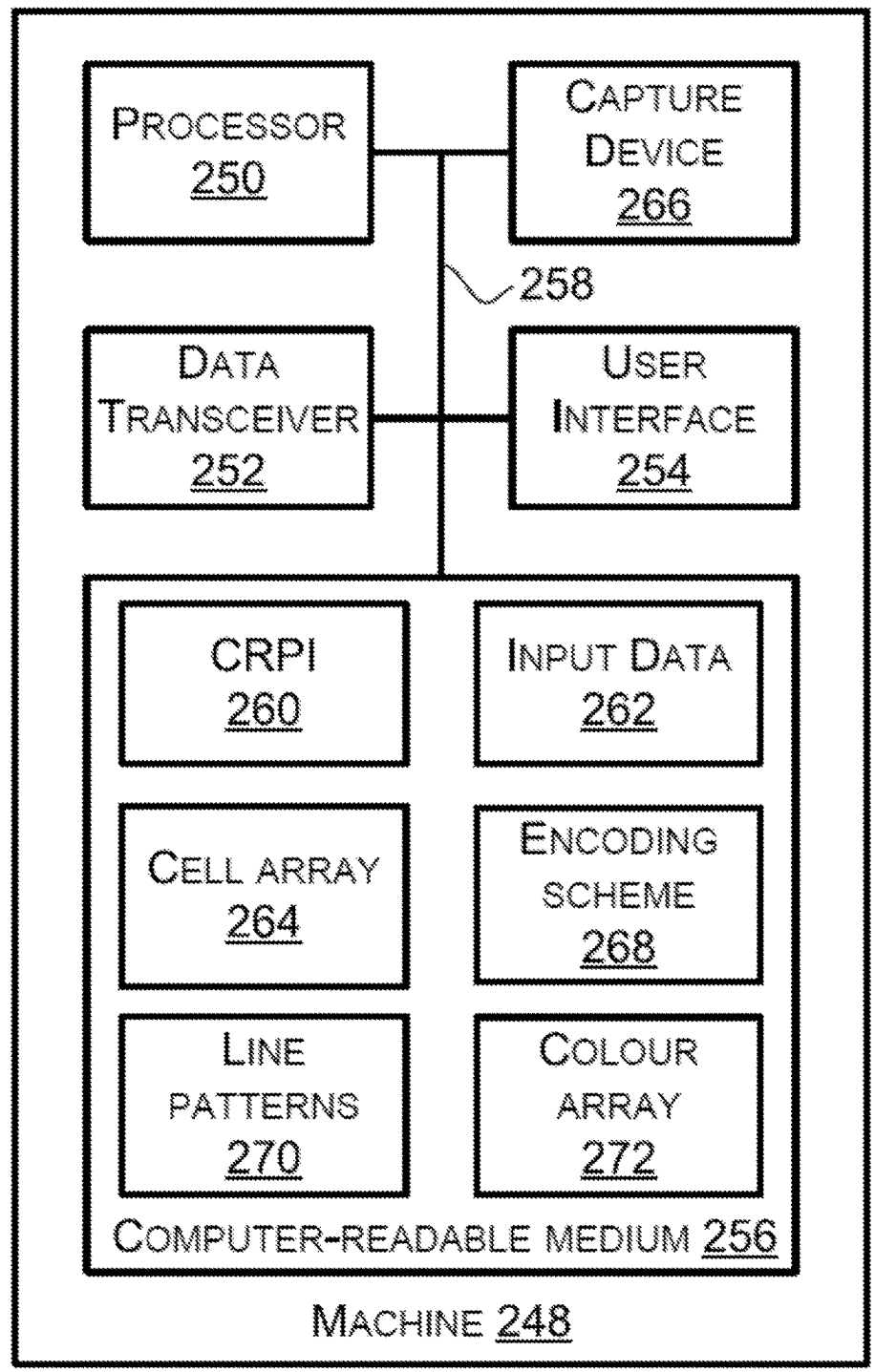
FIG. 14 is a block diagram showing an example machine in accordance with one or more example embodiments.

Next, FIG. 14 is a block diagram of an example machine 248. One or more of machines 212 and 230 can be arranged like machine 248 or a portion thereof. As shown in FIG. 14, machine 248 can include a processor 250, a data transceiver 252, a user interface 254, a computer-readable medium 256, and a capture device 266, all of which may be coupled together by a system bus, network, or other connection mechanism 258. Machine 248 can comprise a smartphone or a tablet device, but is not so limited.

A processor, such as processor 250, can comprise one or more general purpose processors (e.g., INTEL single core microprocessors or INTEL multicore microprocessors) or one or more special purpose processors (e.g., digital signal processors). A processor can be configured to execute computer-readable program instructions (CRPI) stored in a data storage device (e.g., a memory). A processor can be referred to as a computing device or a computer-readable processor.

Data transceiver 252 can include one or more transmitters (e.g., a wireless communication link transmitter or a wired communication link transmitter). A wireless communication link transmitter can be configured to transmit data to or over a wireless communication link. A wired communication link transmitter can be configured to transmit data to or over a wired communication link. Data transceiver 252 can include one or more receivers (e.g., a wireless communication link receiver or a wired communication link receiver). A wireless communication link receiver can be configured to receive data transmitted over or by a wireless communication link. A wired communication link receiver can be configured to receive data transmitted over or by a wired communication link. Data transceiver 252 can include one or more antennas, such as one or more antennas connected to a wireless communication link transmitter or a wireless communication link receiver. Data transceiver 252 can include a network interface card configure to interface with a wired communication link, such as wired communication link 220.

Data transceiver 252 can be configured to receive an input, such as input data 210. Data transceiver 252 can be configured to transmit an encoded cell or a cell array (or data indicating the encoded cell or cell array) to an element in outputting stage 204, such as network 214 or printer 216.

User interface 254 can include one or more input components for inputting data, such as input data 210, into machine 248. As another example, user interface 254 can be configured to receive an input request to cause the computing device to scan or decode a cell array. The input request can be a scan request, a decode request or another request. The one or more input components can include, but is not limited to, a computer keyboard, a touch screen display, a computer mouse or other pointing device, or an audio microphone.

User interface 254 can include one or more output components for presenting data, such as a cell array, to a user. The one or more output components can include, but is not limited to, a display (such as an LED, an LCD, a CRT display, or plasma display) or an audio speaker. One or more components, such as the touch screen display, can function as an input component and an output component.

Capture device 266 comprises one or more components configured to capture a cell array, such as cell array 30. As an example, a component configured to capture a cell array includes a digital camera configured to capture an image of the cell array or to scan an image of the cell array. Capture device 266 can use a quantity of dots per inch (DPI) to store a representation of the cell array (i.e., the captured cell array). The specified DPI can indicate the noise level of encoded cells that can be accurately decoded by machine 248. In capturing a cell array, capture device 266 can capture individual cells of the cell array. Capture device 266 can comprise a camera within a smartphone or tablet device, but is not so limited.

Computer-readable medium 256 can comprise a non-transitory computer-readable storage medium readable by a processor, such as processor 250. The computer-readable storage medium can comprise volatile and/or non-volatile storage components, such as optical, magnetic, organic or other memory or disc storage, which can be integrated in whole or in part with a processor. Computer-readable medium 256 may also or alternatively be provided separately, as a non-transitory machine readable medium.

Additionally or alternatively, computer-readable medium 256 can comprise a transitory computer-readable medium. The transitory computer-readable medium can include, but is not limited to, a communications medium such as a digital or analogue communications medium (e.g., a fiber optic cable, a waveguide, a wired communication link, or a wireless communication line).

Computer-readable medium 256 can store various data for use by machine 248 to carry out any functions described herein as being performed or performable by machine 212, 230, or 248. As an example, computer-readable medium 256 can store computer-readable program instructions (CRPI) 260, input data 262, a cell array 264, an encoding scheme 268, a set of line patterns 270, and a colour array 272. CRPI 260 can be written according to any of a variety of computer programming languages such as, but not limited to, the C and C++ programming languages. Input data 262 can include input data 210, including input data to be encoded into an encoded cell or a cell array. Input data 262 can include one or more encoding scheme selections.

Cell array 264 can include one or more cell arrays as described herein. In accordance with an example embodiment in which machine 248 is used to encode a binary identifier, such as machine 212, cell array 264 can include one or more cell arrays encoded by processor 250. In accordance with an example embodiment in which machine 248 is used to decode a cell array, cell array 264 can include one or more cell arrays captured by capture device 266. Cell array 264 can include one or more cell arrays encoded by processor 250 and one or more cells captured by capture device 266.

Encoding scheme 268 can include one or more encoding schemes usable by processor 250 to encode a binary identifier or to decode a captured cell array. Encoding scheme 268 can include an encoding scheme that including encoding scheme data (ESD) that defines a cell array. The ESD can include data defining the cell shape(s) available for encoding cells in the cell array. The ESD can include data defining a pitch dimension. The ESD can include data defining a reference angle position. The ESD can include data defining which line patterns are available for encoding cells in the cell array. That ESD can include data defining how many line patterns are available for encoding cells in the cell array. The ESD can include data that represents a cell colour. The ESD can include data defining a predetermined sequence of bits corresponding to each available line pattern. The ESD can include data defining which cell colours are available for encoding cells in the cell array. The ESD can include data defining how many cell colours are available for encoding cells in the cell array. The ESD can include data defining a predetermined sequence of bits for each available cell colour. The ESD can include data defining a bit order for any cell encoding more than one predetermined sequence of bits. The ESD can include data defining one or more decoding cells available for placement in the cell array. The ESD can include data defining whether gaps cells are available for placement in the cell array. The ESD can include a data representation of a cell corresponding to each of the state numbers. The ESD can include data representation of a cell can include data that represents a line pattern of the cell to distinguish the cell from other cells. The ESD can define an alignment mark available for placement in a cell. The ESD can define an alignment mark position within a cell. Other examples of the ESD that can be included within an encoding scheme 268 are also possible.

Line patterns 270 can comprise one or more sets of line patterns. Each set of line patterns can correspond to one or more encoding schemes. Computing device 250 can use a set of line patterns for comparing to a line pattern of a cell being decoded. A data representation used by encoding scheme 258 can be within line patterns 270.

Colour array 272 can comprise one or more colour arrays. Each colour array 272 can correspond to one or more encoding schemes. Computing device 250 can use a colour array for comparing to a cell colour of a cell being decoded. The data representation used by encoding scheme 258 can be within colour array 272.

Computer-readable medium 256 can comprise a computer-readable medium storing program instructions, that when executed by a computing device, such as processor 250, cause a set of functions to be performed. As an example, the set of functions can include the set of functions 150 described with respect to FIG. 15, the set of functions 160 described with respect to FIG. 16, or the set of functions 170 described with respect to FIG. 17. As another example, the set of functions can describe any combination of functions described in the additional example embodiments numbered 1 to 36, 110 to 143, and 213 to 246.

Machine 248, or elements thereof (e.g., processor 250 and computer-readable medium) that form a machine, can be configured to cause a set of functions to be performed. Computer-readable medium 256 can store program instructions, such as CRPI 260, that when executed by processor 250, cause the set of functions to be performed. As an example, the functions can include the set of functions 150 described with respect to FIG. 15, the set of functions 160 described with respect to FIG. 16, or the set of functions 170 described with respect to FIG. 17. As another example, the set of functions can describe any combination of functions described in the additional example embodiments numbered 1 to 36, 110 to 143, and 213 to 246.

XI. Example Operation

Figure 15:
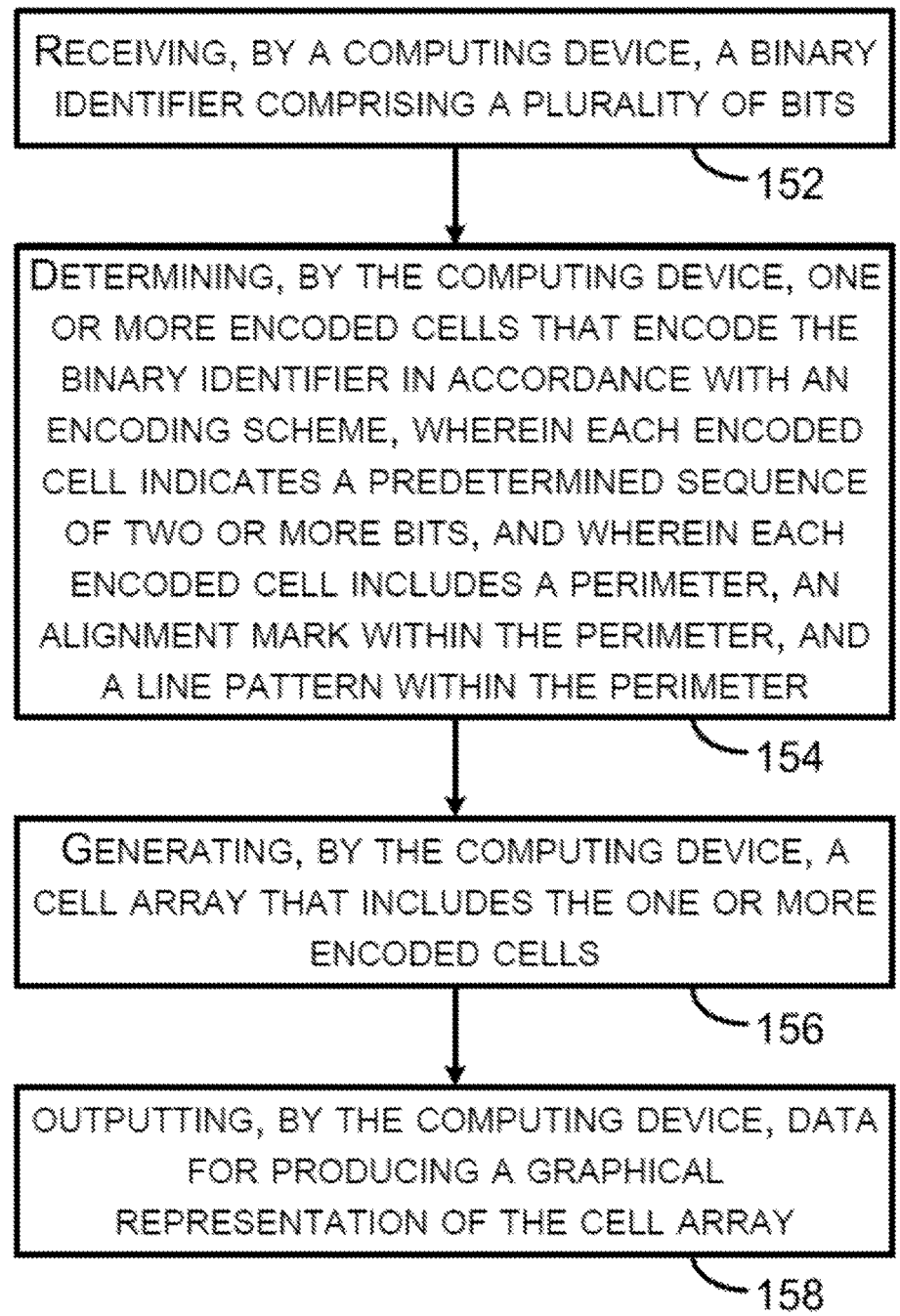
FIG. 15 is a flowchart depicting a set of functions that can be carried out in accordance with one or more example embodiments.

Next, FIG. 15 depicts a flowchart showing a set of functions (e.g., operations) 150 (or more simply, "the set 150") that can be carried out in accordance with one or more of the example embodiments described herein. The functions of the set 150 are shown within blocks labeled with even integers between 152 and 158, inclusive. Any other function(s) described herein can be performed prior to, while, or after performing any one or more of the functions of the set 150. Those other function(s) can be performed in combination with or separately from any one or more of the functions of the set 150. Reference numbers from the figures are included with the following description of FIG. 15 for purposes of example rather than for limiting the description to any particular embodiment. Set 150 can include one or more additional functions. Examples of such additional functions are provided after the description of block 158. Other examples of such additional functions are also possible. CRPI 260 can include program instructions to perform any of the additional functions described with respect to at least one of set 150, set 160, and set 170.

Block 152 includes receiving, by a computing device 250, a binary identifier comprising a plurality of bits. Receiving the binary identifier can include receiving data (e.g., input 210) that indicates each bit of the plurality of bits in a predetermined sequence. Computing device 250 can also receive a non-binary input and convert the non-binary input to the binary identifier. Receiving the binary identifier can include receiving the non-binary identifier and converting the non-binary identifier to an equivalent binary identifier. For example, a non-binary identifier such as the hexadecimal data 45 is equivalent to the binary identifier comprising the binary data 0100 0101. The binary identifier or the non-binary identifier can, for example, include data representing a set of ASCII characters that indicate a string of text, such as "Buy ACME!"

Next, block 154 includes determining, by computing device 250, one or more encoded cells that encode the binary identifier in accordance with an encoding scheme 268, wherein each encoded cell indicates a predetermined sequence of two or more bits, and wherein each encoded cell includes a perimeter, an alignment mark within the perimeter, and a line pattern within the perimeter. The perimeter can be configured as any perimeter described herein, but is not so limited. The alignment mark within the perimeter can be configured like any alignment mark described herein, but is not so limited. The line pattern within the perimeter can be configured as any line pattern described herein, but is not so limited.

Determining the one or more encoded cells in accordance with an encoding scheme 268 can include determining, for each of the one or more encoded cells, a cell colour, such as a cell colour from a plurality of cell (e.g., the colours identified in Table 6 or a different plurality of colours). As shown in Table 6, each cell colour can represent a distinct sequence of binary data, such as two or more bits of data. In accordance with the example embodiments in which the encoding scheme 268 is based on a cell colour and a line pattern, two or more data bits represented by the cell colour can be a precursor to any data bit(s) represented by the line pattern. Alternatively, two or more data bits represented by a line pattern can be a precursor to any data bit(s) represented by a cell colour. In accordance with other embodiments, determining a cell colour can include determining a cell colour associated with a predetermined sequence of two or more bits that matches the predetermined sequence of two or more bits indicated by the line pattern of the cell so as to encode redundant sequences of two or more bits in the encoded cell that can be compared during decoding of the encoded cell to confirm proper decoding.

As another example, encoding scheme 268 can include an encoding scheme based on the data shown in Table 5 and the binary identifier can include the binary data of input 210 shown in FIG. 13 (i.e., 0100, 0010, 0111, 0101, 0111, 1001, 0010, 0000, 0100, 0001, 0100, 0011, 0100, 1101, 0100, 0101, 0010, and 0001). Encoding that binary identifier using the encoding scheme of Table 5 can include computing device 250 identifying each set of four data bits and determining the cell state number that corresponds to the four data bits. In accordance with this example, computing device 250 can determine the following cell state numbers: 5, 3, 8, 6, 8, 10, 3, 1, 5, 2, 5, 4, 5, 14, 5, 6, 3, and 2. Computing device 250 can select data (e.g., a line pattern or colour) representing a cell corresponding to each of the determined state numbers for use in generating a cell array. For other encoding schemes 268, computing device 250 can determine a cell state number that corresponds to a different number of data bits (e.g., 2, 3, 5, 6, 7, 8, or 16 bits).

Next, block 156 includes generating, by the computing device 250, a cell array 30 that includes the one or more encoded cells. Generating the cell array 30 can include the computing device 250 generating cell arrangement data for indicating a position for each cell in the cell array relative to a position of at least one other cell in the cell array. Computing device 250 can therefore determine a position for each cell (e.g., an encoded cell, an alignment cell, a gap, a decoding cell, or a layout cell) within the cell array. Computing device 250 can determine cells other than the encoded cells to include in the cell array based, at least in part, on the selected encoding scheme 268. The generated cell arrangement data can also identify one or more pitch dimensions to specify a pitch between two or more alignment marks in adjacent cells. The cell arrangement data can be stored in within computer-readable medium 256 as a cell array 264.

Next, block 158 includes outputting, by computing device 250, data for producing a graphical representation of the cell array. Outputting the data referenced in block 158 can include transmitting the data from computing device 250 to network 214 for transmission, in turn, to another machine. As an example, the other machine can include printer 216, which can, in turn, print an instance of the graphical representation of the cell array on the surface of an article of manufacture. As another example, the other machine can include an engraving machine (e.g., a laser engraving machine) which can, in turn, engrave an instance of the graphical representation of the cell array on the surface of an article of manufacture. As yet another example, the other machine can include a machine comprising display 226, which can, in turn, display that data as a graphical representation of the cell array.

Since a computing device (e.g., processor 250) can be embodied within a machine, such as machine 248, receiving the binary identifier at block 152, determining the one or more cell arrays at block 154, generating the cell array at block 156, and outputting the data at block 156 can be carried out by the machine (i.e., a machine that embodies the computing device).

Another function that can be performed as part of the set 150 includes determining, by computing device 250, one or more alignment cells, wherein the generated cell array includes the one or more alignment cells. The determined one or more alignment cells can include any one or more of the following: (i) at least one alignment cell that indicates a start point within the cell array, (ii) two or more adjacent cells (e.g., cells 36a and 36b) that collectively identify a starting node (e.g., starting node 34) in the cell array, (iii) at least one alignment cell that indicates an end point within the cell array, (iv) at least one alignment cell that indicates an end point of a row within the cell array, (v) a plurality of coloured alignment cells, and (vi) at least one alignment cell that is an inverse of an empty-cell line pattern, such as the empty-cell line pattern of encoded cell 10 shown in FIG. 1. A coloured alignment cell can be coloured to match a corresponding colour of a plurality of colours, such as the plurality of colours identified in Table 6 or another plurality of colours.

Another function that can be performed as part of the set 150 includes determining, by computing device 250, a layout selection for generating the cell array 30, and determining, by computing device 250, a layout in accordance with the determined layout selection. Generating the cell array 30 can include positioning the one or more encoded cells in the layout in accordance with the determined layout selection. Generating cell array 30 can include positioning one or more layout cells. The one or more layout cells can form a portion of the layout but do not encode any portion of the binary identifier.

Another function that can be performed as part of the set 150 includes determining, by computing device 250, a selected noise tolerance level. The noise tolerance level can be selected from among the noise tolerance levels described herein (i.e. Noise Tolerance Levels I, II, III, and IV) or from among another set of noise tolerance levels that can be defined. The one or more encoded cells in the cell array can have a noise tolerance level that is more noise tolerant or that matches the selected noise tolerance level.

Figure 16:
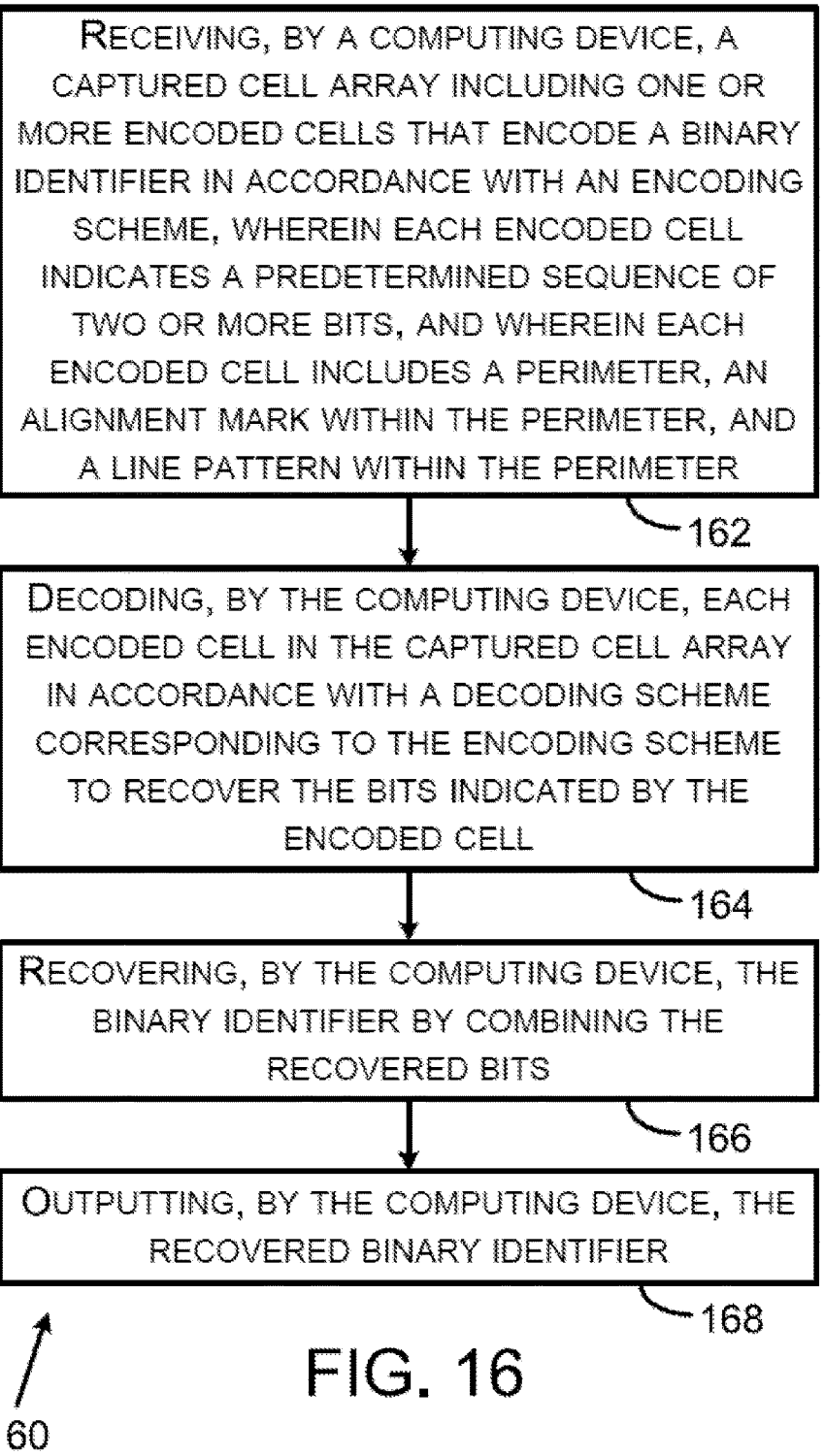
FIG. 16 is a flowchart depicting another set of functions that can be carried out in accordance with one or more example embodiments.

Next, FIG. 16 depicts a flowchart showing a set of functions (e.g., operations) 160 (or more simply, "the set 160") that can be carried out in accordance with one or more of the example embodiments described herein. The functions of the set 160 are shown within blocks labeled with even integers between 162 and 168, inclusive. Any other function(s) described herein can be performed prior to, while, or after performing any one or more of the functions of the set 160. Those other function(s) can be performed in combination with or separately from any one or more of the functions of the set 160. Reference numbers from the figures are included within the following description of FIG. 16 for purposes of example rather than for limiting the description to any particular embodiment. Set 160 can include one or more additional functions. Examples of such additional functions are provided after the description of block 168. Other examples of such additional functions are also possible.

Block 162 includes receiving, by a computing device 250, a captured cell array including one or more encoded cells that encode a binary identifier in accordance with an encoding scheme 268, wherein each encoded cell 10 indicates a predetermined sequence of two or more bits, and wherein each encoded cell includes a perimeter, an alignment mark within the perimeter, and a line pattern within the perimeter. The perimeter can be configured as any perimeter described herein, but is not so limited. The alignment mark within the perimeter can be configured like any alignment mark described herein, but is not so limited. The line pattern within the perimeter can be configured as any line pattern described herein, but is not so limited.

The computing device 250 can receive the captured cell array from various components, such as data transceiver 252, computer-readable medium 256, capture device 266, or another component configured to provide the captured cell array to the computing device. Receiving the captured cell array can include receiving a captured image of the cell array or receiving a scanned image of the cell array. The captured cell array can include at least one decoding cell that includes a decoding instruction (e.g., a decoding instruction that indicates the encoding scheme 268 used to encode the binary identifier).

Next, block 164 includes decoding, by computing device 250, each encoded cell 10 in the captured cell array 30 in accordance with a decoding scheme corresponding to the encoding scheme to recover the bits indicated by the encoded cell. Decoding each encoded cell in the capture cell array can include, but is not limited to, performing any one or more of following functions: (i) detecting, by the computing device, each encoded cell in the captured cell array, and (ii) decoding, by the computing device, a cell colour for each cell of the one or more encoded cells in the cell array. The decoded colour can be one of the colours identified in Table 6. Each colour of the plurality of colours can represent a distinct sequence of two or more bits.

Decoding an encoded cell can also include computing device 250 identifying the line pattern within the encoded cell 10. Computing device 250 can identify an alignment node 31 of cell array 30 regardless of where alignment node 31 is positioned within the capture cell array. For example, alignment node 31 within the capture cell array 30 could be located at a top left portion of cell array 30 as shown in FIG. 10. As another example, alignment node 31 within the captured cell array could be located at a top right position of cell array 30 with one null cell 32 above the other null cell 32. This can be visualized by rotating FIG. 10 clockwise 90 degrees. As yet another example, alignment node 31 within the captured cell array could be located at a lower right position of cell array 30. This can be visualized by rotating FIG. 10 clockwise 180 degrees.

Computing device 250 can determine the pitch between alignment marks in the first two cells of an alignment node. Computing device 250 can use the determined pitch to locate an alignment mark in a cell to be decoded (e.g., a cell adjacent to an alignment cell or a cell adjacent to a previously decoded cell). Computing device 250 can use the determined pitch to determine the perimeter of the cell to be decoded. Computing device 250 can compare a line pattern within the determined perimeter of the cell being decoded to a set of line patterns 270. Computing device 250 can determine a line pattern within the set of line patterns 270 that matches the line pattern of the cell being decoded in order to determine the state number or bit sequence encoded by the cell being decoded.

Next, block 166 includes recovering, by computing device 250, the binary identifier by combining the recovered bits. Combining the recovered bits can include combining the bits recovered for each cell into a predetermined sequence of bits and then combining the predetermined sequence of bits for each cell according to an order that the cells occur in the cell array. If the cell encodes a colour and a line pattern, the predetermined sequence can include two or more bits including two or more bits based on the line pattern within the perimeter of the cell and two or more bits represented by the cell colour. In one respect, the two or more bits represented by the cell colour can be a precursor to the two or more bits based on the line pattern. In another respect, the two or more bits based on the line pattern can be a precursor to the two or more bits represented by the cell colour.

Next, block 168 includes outputting, by computing device 250, the recovered binary identifier. Outputting the recovered binary identifier can include a machine, including the computing device and a display, displaying the recovered binary identifier on the display. Outputting the recovered binary identifier can include transmitting the recovered binary identifier from the computing device to a display device, such as a display device of user interface 254.

Another function that can be performed as part of the set 160 includes identifying, by the computing device, one or more alignment cells within the captured cell array. Identifying each alignment cell can include identifying a null cell, such as null cell 36a or 36b. Identifying the null cell can include identifying, by the computing device within the captured image, a perimeter and an alignment mark within the perimeter. The identified one or more alignment cells can include any one or more of the following: (i) at least one alignment cells that indicates a start point within the cell array, (ii) an alignment node including two or more adjacent alignment cells that collectively identify a start point within the cell array, (iii) at least one alignment cell that indicates an end point within the cell array, (iv) at least one alignment cell that indicates an end point of a row within the cell array, (v) a plurality of coloured alignment cells, each coloured alignment cell comprises an alignment cell coloured to match a corresponding colour of a plurality of colours, and (vi) at least one alignment cell that is an inverse of an empty-cell line pattern.

Another function that can be performed as part of the set 160 includes determining, by the computing device, a dimension of distance from a portion of the perimeter, such as an outer edge of the perimeter, of the null cell to some portion of the alignment mark, such as the centre of the alignment mark. Computing device 250 can use the dimension to determine a pitch between adjacent cells in the cell array. As an example, computing device 250 can multiply the dimension by two to determine the pitch. Identifying the one or more alignment cells can include computing device 250 determining whether any other alignment cell is adjacent to an identified alignment cell by searching for another alignment mark located within a distance equal to the determined pitch relative to a location of the identified alignment cell. Upon locating another alignment cell, computing device 250 can determine whether the cell including the located alignment cell is a null cell.

Another function that can be performed as part of the set 160 includes determining, by the computing device, a distance between alignment marks within two adjacent alignment cells, and determining, by the computing device, presence of an encoded cell in the captured cell array by detecting an alignment mark of the encoded cell in the captured cell array and an alignment mark of another captured cell array being separated by a distance equal to the distance between alignment marks within two adjacent cells.

Another function that can be performed as part of the set 160 includes converting, by the computing device, the recovered binary identifier to an alphanumeric representation of the recovered binary identifier. In such a case, outputting the recovered binary identifier can include transmitting the alpha-numeric representation to a printer or display device. The alpha-numeric representation for input 210 can be "Buy ACME!" as shown in FIG. 13.

Next, FIG. 17 depicts a flowchart showing a set of functions (e.g., operations) 170 (or more simply, "the set 170") that can be carried out in accordance with one or more of the example embodiments described herein. The functions of the set 170 are shown within blocks labeled with even integers between 172 and 174, inclusive. Any other function(s) described herein can be performed prior to, while, or after performing any one or more of the functions of the set 170. Those other function(s) can be performed in combination with or separately from any one or more of the functions of the set 170. Reference numbers from the figures are included within the following description of FIG. 170 for purposes of example rather than for limiting the description to any particular embodiment. Set 170 can include one or more additional functions. Examples of such additional functions are provided after the description of block 174. Other examples of such additional functions are also possible.

Block 172 includes receiving, by a computing device, data specifying a cell array, wherein the cell array includes one or more encoded cells that encode a binary identifier in accordance with an encoding scheme, wherein each encoded cell indicates a predetermined sequence of two or more bits, and wherein each encoded cell includes a perimeter, an alignment mark within the perimeter, and a line pattern within the perimeter.

The received data can indicate a cell colour for each of the one or more encoded cells. Each cell colour can represent a distinct sequence of two or more bits. The received data can indicate a cell colour for any other cells within the specified cell array. The perimeter can be configured as any perimeter described herein, but is not so limited. The alignment mark within the perimeter can be configured like any alignment mark described herein, but is not so limited. The line pattern within the perimeter can be configured as any line pattern described herein, but is not so limited.

Next, block 174 includes displaying, by a display connected to the computing device, a graphical representation of the cell array, wherein the displayed cell array includes the one or more encoded cells that encode the binary identifier in accordance with the encoding scheme, wherein each displayed encoded cell indicates a predetermined sequence of two or more bits, and wherein each encoded cell includes a perimeter, an alignment mark within the perimeter, and a line pattern within the perimeter.

The display can be connected to computing device 250 by at least one of a wireless communication link, a wired communication link, and a wired and wireless communication link.

The predetermined sequence of two or more bits can include two or more bits based on the line pattern within the perimeter and two or more bits based on a cell colour. The two or more bits represented by the cell colour can be a precursor to the two or more bits based on the line pattern. The two or more bits represented by the line pattern can be a precursor to the two or more bits based on the cell colour. For each of the one or more encoded cells, the distinct sequence of two or more bits represented by the cell colour indicated for the cell can match the predetermined sequence of two or more bits indicated by the line pattern of the cell so as to encode redundant sequences of two or more bits in the encoded cell that can be compared during decoding of the encoded cell to confirm proper decoding.

The cell array can include one or more alignment cells. The received data can indicate the one or more alignment cells within the cell array. The one or more alignment cells can include any of the following: (i) a plurality of coloured alignment cells, (ii) at least one alignment cell that indicates a start point within the cell array, (iii) an alignment node including two or more adjacent alignment cells that collectively identify a start point within the cell array, (iv) at least one alignment cell that indicates an end point within the cell array, (v) at least one alignment cell that indicates an end point of a row within the cell array, and (vi) at least one alignment cell that is an inverse of an empty-cell line pattern.

The plurality of colours can include a predetermined number of colours. The two or more adjacent cells can include a predetermined number of cells equal to the predetermined number of colours. Each cell of the two or more adjacent cells can correspond to a distinct colour of the predetermined number of colours.

Another function that can be performed as part of the set 170 includes receiving, by computing device 250, a non-binary identifier equivalent to the binary identifier, and converting, by computing device 250, the non-binary identifier to the binary identifier. Accordingly, receiving the binary identifier can include receiving the binary identifier converted by computing device 250 from the non-binary identifier.

The descriptions of FIG. 15 to FIG. 17 refer to computing device 250 and machine 248. A separate instance of computing device 250 and machine 248 can be used to carry out one or more of the functions of the sets 150, 160, and 170, but is not necessary, as a single instance of computing device 250 or machine 248 can carry out one or more of the functions of the sets 150, 160, and 170.

XII. Alternative Encoded Cells

Next, FIG. 11 illustrates an example cell array 60 including alignment node 61 and encoded cells 62. Alignment node 61 and encoded cells 62 are rectangular, and can be square. Alignment node 61 may include adjacent null cells 57, as shown in FIG. 11. Encoded cells 62 include a rectangular perimeter (e.g., a square perimeter) 63, an alignment mark 65 within perimeter 63, and a line pattern 66 within perimeter 63. Perimeter 63 can define a rectangular cell body 64. Perimeter 63 can be black or another colour, such as a colour identified in Table 6. Alignment mark 65 is centrally located within cell 62, but alternatively, may be offset from a centre of cell 62. Alignment mark 65 is represented as a circle (e.g., a dot) in FIG. 11, but is not so limited. As shown in FIG. 11, a cell array can include closely-packed rectangular-shaped cells. Cell arrays using rectangular-shaped cells can be created in any of a variety of shapes, such as the letter Z or another shape.

FIG. 11 shows encoded cells 62 with 22 different line patterns (or states). Each cell has one of the defined noise tolerant levels, as shown in Table 11. Each of the 22 line patterns can be associated with up to 4 bits of binary data or a decoding instruction as shown in Table 11. Cell states #17 to #19 can identify a tolerance level of one or more cells within a cell array, such as one or more cells that follow a cell with cell state #17, #18, or #19. Another tolerance level, such as tolerance level I, of one or more cells can be implied for a number of encoded cells within a cell array, such as one or more cells located at the beginning of a row or one or more cells following occurrence of two cells identifying a tolerance level other than the implied tolerance level. Cell state #22 can correspond to an empty-cell line pattern 67.

TABLE 11

| Cell State | Binary Data | Decoding instruction | Noise Tolerance |
|---|---|---|---|
| #1 | 0000 | N.A. | Level I |
| #2 | 0001 | N.A. | Level I |
| #3 | 0010 | N.A. | Level I |
| #4 | 0011 | N.A. | Level I |
| #5 | 0100 | N.A. | Level I |
| #6 | 0101 | N.A. | Level I |
| #7 | 0110 | N.A. | Level I |
| #8 | 0111 | N.A. | Level I |
| #9 | 1000 | N.A. | Level II |
| #10 | 1001 | N.A. | Level II |
| #11 | 1010 | N.A. | Level II |
| #12 | 1011 | N.A. | Level II |
| #13 | 1100 | N.A. | Level II |
| #14 | 1101 | N.A. | Level II |
| #15 | 1110 | N.A. | Level II |
| #16 | 1111 | N.A. | Level II |
| #17 | N.A. | Tolerance Level 2 | Level III |
| #18 | N.A. | Tolerance Level 3 | Level III |
| #19 | N.A. | Tolerance Level 4 | Level II |
| #20 | N.A. | Start of row | Level II |
| #21 | N.A. | End of row | Level IV |
| #22 | N.A. | End of array | Level IV |

Figure 12:
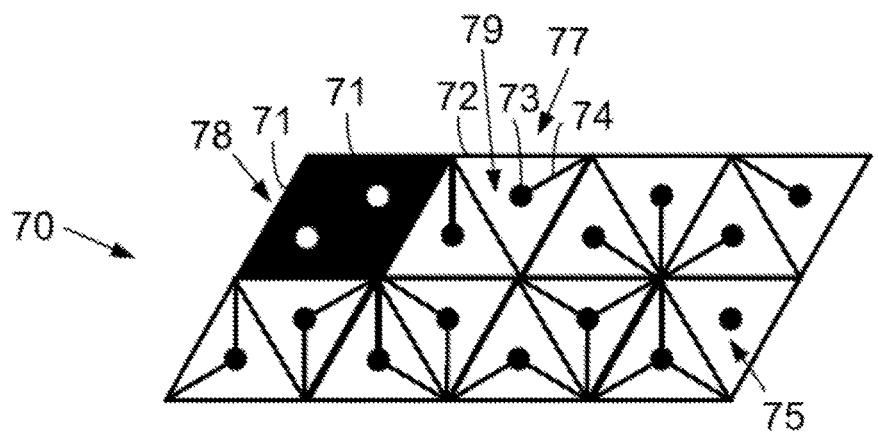
FIG. 12 illustrates a schematic representation of additional encoded cells in accordance with one or more example embodiments.

Next FIG. 12 illustrates an example cell array 70 including an alignment node 78 and 14 instances of a triangle shaped (or more simply, "triangular") encoded cell 77 (only one of which is labeled for clarity of the figure). Alignment node 78 can include two triangular null cells 71. Encoded cells 77 includes a triangular perimeter 72, an alignment mark 73 within perimeter 72, and a line pattern 74 within perimeter 72. Perimeter 72 can define a triangular cell body 79. Perimeter 72 can be black or another colour, such as a colour identified in Table 6. Alignment mark 73 can be centrally located within cell 72, but alternatively, can be offset from a centre of cell 72. Alignment mark 73 is represented as a circle (e.g., a dot) in FIG. 12, but is not so limited. As shown in FIG. 12, a cell array can include closely-packed triangle-shaped cells. Cell arrays using triangular-shaped cells can be created in any of a variety of shapes. FIG. 12 shows encoded cells 72 with 14 different line patterns including an empty-cell line pattern 75. Those 14 different line patterns can, for example, encode 3 bits, and be associated with 6 decoding instructions. Alternatively, two or more additional and different line patterns can be defined for a triangle-shaped cell such that 4 bits of binary data can be encoded by 16 different line patterns within triangle-shaped cells.

Next, FIG. 19 illustrates an example cell array 113 including an alignment node 115 and 14 instances of a cross-shaped encoded cells 119 (only one of which is labeled for clarity of the figure). Alignment node 115 can include two cross-shaped null cells 117. Encoded cells 119 includes a cross-shaped perimeter 123, an alignment mark 125 within perimeter 123, and a line pattern 121 within perimeter 123. Perimeter 123 can define a cross-shaped cell body 127. Perimeter 123 can be black or another colour, such as a colour identified in Table 6. Alignment mark 125 can be centrally located within cell 123, but alternatively, can be offset from a centre of cell 123. Alignment mark 125 is represented as a circle (e.g., a dot) in FIG. 19, but is not so limited. As shown in FIG. 19, a cell array can include closely-packed cross-shaped cells 119. Cell arrays using cross-shaped cells can be created in any of a variety of shapes. FIG. 19 shows encoded cells 119 with fourteen different line patterns including an empty-cell line pattern 129. Those fourteen different line patterns can, for example, encode three bits, and be associated with six decoding instructions. Alternatively, two or more additional and different line patterns can be defined for a cross-shaped cell such that four bits of binary data can be encoded by sixteen different line patterns within cross-shaped cells.

XIII. Article of Manufacture

The example embodiments can also include or pertain to an article of manufacture. In accordance with the example embodiments, an article of manufacture can include a surface and a cell array at the surface. The cell array can be readable by computing device 250. The surface can comprise a metal surface, a plastic surface, a glass surface, or a wooden surface. The surface can be made of metal, plastic, glass, wood, or some other material on which a cell array can be positioned at the surface.

The cell array at the surface can be configured like any cell array described herein or like a cell array including any of the cell array features described herein. As an example, the cell array can include one or more encoded cells that encode, in accordance with an encoding scheme, a binary identifier that represents information pertaining to the article of manufacture. The binary identifier can comprise a plurality of bits. Each encoded cell can indicate a predetermined sequence of two or more bits. The predetermined sequence of two or more bits can include two or more bits based on the line pattern within the perimeter and two or more bits represented by the cell colour. Either of those predetermined sequence of two or more bits can be a precursor to the other predetermined sequence of two or more bits. The predetermined sequence of two or more bits for one or more of the encoded cells can be based on an angular position of the line pattern from a predetermined reference direction.

Each encoded cell can include a perimeter, an alignment mark within the perimeter, and a line pattern within the perimeter. The article of manufacture can comprise a magazine or a newspaper. The information pertaining to the article of manufacture can include at least one of an advertisement, a uniform resource locator (URL), and a telephone number.

The cell array at the surface can comprise a cell array on the surface. The cell array on the surface can comprise a cell array printed on the surface. The cell array on the surface can comprise a cell array affixed to the surface using an adhesive.

The cell array at the surface can comprise a cell array within the surface. The cell array within the surface can comprise a cell array engraved within the surface. The cell array within the surface can comprise a cell array etched within the surface.

The perimeter can be configured as any perimeter described herein, but is not so limited. The alignment mark within the perimeter can be configured like any alignment mark described herein, but is not so limited. The line pattern within the perimeter can be configured as any line pattern described herein, but is not so limited.

The cell array at the surface can include an alignment cell. The alignment cell can be configured as any alignment cell described herein, but is not so limited. The cell array at the surface can include a decoding cell. The decoding cell can be configured as any decoding cell described herein, but is not so limited. The cell array at the surface can include one or more layout cells that form a portion of the cell array but to not encode any portion of the binary identifier.

Each of the one or more encoded cells can be a coloured cell colour. That cell colour can be one of plurality of colours such as the plurality of colours shown in Table 6. The cell colour can be associated with a predetermined sequence of two or more bits that matches the predetermined sequence of two or more bits indicated by the line pattern of the cell so as to encode redundant sequences of two or more bits in the encoded cell that can be compared during decoding of the encoded cell to confirm proper decoding.

XIV. Additional Aspects of Example Embodiments

Clearly, numerous variations and permutations are possible to the embodiments without departing from the scope of this disclosure: Some of these variations and permutations are described below.

In accordance with one or more of the disclosed embodiments, an encoded cell may be a dodecagon (i.e. 12-sided) instead of a hexagon or the other shapes as described. In such an arrangement, an asymmetric line pattern may be aligned in any one of sixteen possible directions, at angular increments of 22.5° from the reference direction. Such an arrangement will increase the quantity of data that can be encoded by encoded cell relative to the line patterns of encoded cell spaced at 45° intervals. A cell array including dodecagon shaped encoded cells can include other dodecagon shaped cells that are configured as an alignment cell, a decoding cell, or a cell used for another feature described herein.

In accordance with one or more of the disclosed embodiments, instead of the colour attribute of encoded cell 10 being used as precursor to the binary data represented by the state of the cell, the colour attribute may be used as a successor to the binary data represented by the line pattern of the cell. In particular, the colour of encoded cell 10 may be used to represent the least significant bits of a concatenation with the binary data represented by the line pattern (or cell state). As an illustration, in the above example where encoded cell 10 can be presented in any one of 8 different colours, a blue encoded cell with level I fault tolerance representing binary data 011 (as indicated by reference numeral 24 in FIG. 2) will yield a concatenated bit pattern of 011101.

In accordance with one or more of the disclosed embodiments, instead of the colour attribute with 8 permissible colours, the number of permissible colours may be doubled to 16, thereby increasing the data capacity of the encoded cell by one bit. In this example, the alignment cell of an encoded cell can include an ordered string of 17 adjacent null cells, one in each of the 16 permissible colours of the encoded cell, with the two adjacent instances of the leading null cell.

XV. Conclusion

Example aspects and embodiments have been described above for purposes of illustration and are not intended to be limiting. Those skilled in the art will understand that changes and modifications can be made to the described aspects and embodiments without departing from the true scope and spirit of the present invention, which is defined by the claims.

Alternative embodiments are included within the scope of these example embodiments. In these alternative embodiments, for example, functions described as steps, blocks, transmissions, communications, requests, responses, and/or messages can be executed out of order from that shown or discussed, including in substantially concurrent or in reverse order, depending on the functionality involved.

Finally, the description includes words using British English spellings, such as colour, coloured, colours, analogue, centre, millimeters, and centimeters rather than the equivalent American English spellings color, colored, colors, analog, center, millimeters, and centimeters, respectively.

The invention claimed is:

1. A method comprising:
receiving, by a computing device, a captured cell array that includes one or more encoded cells and that encodes a binary identifier in accordance with an encoding scheme, wherein each encoded cell indicates two or more bits of the binary identifier in a predetermined sequence, and wherein each encoded cell includes a perimeter, an alignment mark within the perimeter, a line pattern within the perimeter, and wherein the line pattern within the perimeter for each of at least one encoded cell includes a line positioned radially with respect to the alignment mark of the at least one encoded cell to represent at least two bits in the predetermined sequence of the at least one encoded cell;
decoding, by the computing device, each encoded cell in the captured cell array in accordance with a decoding scheme corresponding to the encoding scheme to recover the bits indicated by the encoded cell;
recovering, by the computing device, the binary identifier by combining the recovered bits; and
outputting, by the computing device, the recovered binary identifier.

2. The method of claim 1, wherein decoding each encoded cell in the captured cell array includes detecting, by the computing device, each encoded cell in the captured cell array.

3. The method of claim 2, further comprising:
identifying, by the computing device, one or more alignment cells within the captured cell array.

4. The method of claim 3, wherein the one or more alignment cells includes a plurality of colored alignment cells, each colored alignment cell comprises an alignment cell colored to match a corresponding color of the plurality of colors.

5. The method of claim 1,
wherein decoding each encoded cell in accordance with the decoding scheme includes decoding, for each of the one or more encoded cells, a cell color, and
wherein the cell color is one of a plurality of colors.

6. The method of claim 1,
wherein the line pattern in each encoded cell corresponds to one of a plurality of predefined line patterns, and
wherein each predefined line pattern corresponds to a predetermined sequence of two or more bits.

7. The method of claim 6, wherein the plurality of predefined line patterns comprises an empty-cell line pattern.

8. The method of claim 6, wherein each of one or more of the plurality of predefined line patterns comprises one or more asymmetric radial vectors.

9. The method of claim 6, wherein each of one or more of the plurality of predefined line patterns comprises one or more diametric vectors.

10. The method of claim 6, wherein each of one or more of the plurality of predefined line patterns comprises a symmetric cross.

11. The method of claim 6, wherein each of one or more of the plurality of predefined line patterns comprises a symmetric star.

12. The method of claim 6, wherein each of one or more of the plurality of line patterns comprises a curved line pattern.

13. The method of claim 1, wherein the perimeter is a polygon.

14. The method of claim 13, wherein the polygon is a triangle, a quadrilateral, pentagon, a hexagon, or a dodecagon.

15. The method of claim 14,
wherein the alignment mark includes an alignment mark center,
wherein the polygon includes a polygon center, and
wherein the alignment mark center is at the polygon center.

16. The method of claim 14,
wherein the alignment mark includes an alignment mark center,
wherein the polygon includes a polygon center, and
wherein the alignment mark center is offset from the polygon center.

17. The method of claim 1, wherein outputting the recovered binary identifier includes transmitting the recovered binary identifier from the computing device to a display device.

18. The method of claim 1, further comprising:
converting, by the computing device, the recovered binary identifier to an alpha-numeric representation of the recovered binary identifier,
wherein outputting the recovered binary identifier includes transmitting the alpha-numeric representation to a printer or to a display device.

19. A machine comprising:
a computing device; and
a computer-readable medium storing program instructions, that when executed by the computing device, cause a set of functions to be performed, the set of functions comprising:
receiving, by the computing device, a captured cell array that includes one or more encoded cells and that encodes a binary identifier in accordance with an encoding scheme, wherein each encoded cell indicates two or more bits of the binary identifier in a predetermined sequence, wherein each encoded cell includes a perimeter, an alignment mark within the perimeter, and a line pattern within the perimeter, wherein the line pattern within the perimeter for each of at least one encoded cell includes a line positioned radially with respect to the alignment mark of the at least one encoded cell to represent at least two bits in the predetermined sequence of the at least one encoded cell;
decoding, by the computing device, each encoded cell in the captured cell array in accordance with a decoding scheme corresponding to the encoding scheme to recover the bits indicated by the encoded cell;

recovering, by the computing device, the binary identifier by combining the recovered bits; and outputting, by the computing device, the recovered binary identifier.

20. A computer-readable medium storing program instructions, that when executed by a computing device, cause a set of functions to be performed, the set of functions comprising:

receiving, by the computing device, a captured cell array that includes one or more encoded cells and that encodes a binary identifier in accordance with an encoding scheme, wherein each encoded cell indicates two or more bits of the binary identifier in a predetermined sequence, wherein each encoded cell includes a perimeter, an alignment mark within the perimeter, and a line pattern within the perimeter, and wherein the line pattern within the perimeter for each of at least one encoded cell includes a line positioned radially with respect to the alignment mark of the at least one encoded cell to represent at least two bits in the predetermined sequence of the at least one encoded cell;

decoding, by the computing device, each encoded cell in the captured cell array in accordance with a decoding scheme corresponding to the encoding scheme to recover the bits indicated by the encoded cell;

recovering, by the computing device, the binary identifier by combining the recovered bits; and outputting, by the computing device, the recovered binary identifier.

* * * * *

UNITED STATES PATENT AND TRADEMARK OFFICE
CERTIFICATE OF CORRECTION

PATENT NO. : 10,157,301 B2
APPLICATION NO. : 15/304112
DATED : December 18, 2018
INVENTOR(S) : John Adam Ulyate Page 1 of 1

It is certified that error appears in the above-identified patent and that said Letters Patent is hereby corrected as shown below:

In the Specification

In Column 28, Line 27, replace FIG. 170 with FIG. 17

Signed and Sealed this
Twentieth Day of October, 2020

Andrei Iancu
*Director of the United States Patent and Trademark Office*